US012314485B2

(12) United States Patent
Ajanohoun et al.

(10) Patent No.: US 12,314,485 B2
(45) Date of Patent: May 27, 2025

(54) DEVICE-TO-DEVICE COLLOCATED AR USING HAND TRACKING

(71) Applicant: Snap Inc., Santa Monica, CA (US)

(72) Inventors: Jordy Innocentius Ajanohoun, Vienna (AT); Markus Diem, Vienna (AT); Georgios Evangelidis, Vienna (AT); Matthew Penney, Vienna (AT)

(73) Assignee: Snap Inc., Santa Monica, CA (US)

( * ) Notice: Subject to any disclaimer, the term of this patent is extended or adjusted under 35 U.S.C. 154(b) by 32 days.

(21) Appl. No.: 18/357,050

(22) Filed: Jul. 21, 2023

(65) Prior Publication Data

US 2024/0345665 A1 Oct. 17, 2024

(30) Foreign Application Priority Data

Apr. 11, 2023 (GR) ................................ 20230100308

(51) Int. Cl.
*G06F 3/01* (2006.01)
*G06F 3/0346* (2013.01)
*G06T 7/70* (2017.01)
*G06T 7/80* (2017.01)

(52) U.S. Cl.
CPC ............ *G06F 3/0346* (2013.01); *G06F 3/011* (2013.01); *G06T 7/70* (2017.01); *G06T 7/80* (2017.01); *G06T 2207/30196* (2013.01); *G06T 2207/30244* (2013.01)

(58) Field of Classification Search
None
See application file for complete search history.

(56) References Cited

U.S. PATENT DOCUMENTS

| 7,971,156 | B2 | 6/2011 | Albertson et al. |
| 7,996,793 | B2 | 8/2011 | Latta et al. |
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |

(Continued)

FOREIGN PATENT DOCUMENTS

| CN | 103049761 B | 8/2016 |
| EP | 3707693 A1 | 9/2020 |

(Continued)

OTHER PUBLICATIONS

"International Application Serial No. PCT/US2024/022811, International Search Report mailed Jul. 5, 2024", 3 pgs.

(Continued)

*Primary Examiner* — Brian M Butcher
(74) *Attorney, Agent, or Firm* — Schwegman Lundberg & Woessner, P.A.

(57) ABSTRACT

A method for aligning coordinate systems from separate handheld devices is described. In one aspect, the method includes accessing first pose data of a first handheld device, receiving second pose data of a second handheld device, detecting, from the first handheld device, hand-tracking data of a second user holding the second handheld device, and aligning a first coordinate system of the first handheld device with a second coordinate system of the second handheld device based on the first pose data, the second pose data, and the hand-tracking data of the second user holding the second handheld device.

16 Claims, 13 Drawing Sheets

(56) References Cited

U.S. PATENT DOCUMENTS

| | | |
|---|---|---|
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2012/0249416 A1* | 10/2012 | Maciocci ............ H04N 9/3173 345/156 |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2019/0146219 A1 | 5/2019 | Rodriguez, II |
| 2019/0197788 A1 | 6/2019 | Forbes et al. |
| 2020/0304942 A1 | 9/2020 | Pollefeys |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |

FOREIGN PATENT DOCUMENTS

| | | |
|---|---|---|
| EP | 4172726 A1 | 5/2023 |
| EP | 4172730 A1 | 5/2023 |
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2024215538 A1 | 10/2024 |

OTHER PUBLICATIONS

"International Application Serial No. PCT/US2024/022811, Written Opinion mailed Jul. 5, 2024", 7 pgs.

* cited by examiner

DEVICE-TO-DEVICE COLLOCATED AR USING HAND TRACKING

CLAIM OF PRIORITY

This application claims the benefit of priority to Greece Patent Application Serial No. 20230100308, filed on Apr. 11, 2023, which is incorporated herein by reference in its entirety.

TECHNICAL FIELD

The subject matter disclosed herein generally relates to handheld devices. Specifically, the present disclosure addresses systems and methods for aligning coordinate systems of handheld devices.

BACKGROUND

An augmented reality (AR) device enables a user to observe a scene while simultaneously seeing relevant virtual content that may be aligned to items, images, objects, or environments in the field of view of the device. In multiple AR devices, each device has its own 6 degrees of freedom (6DoF) tracker. Sharing AR experiences between multiple AR devices can be difficult because the reference coordinate system (frame) of each device is different. As such, a virtual object displayed in the AR devices can appear different.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
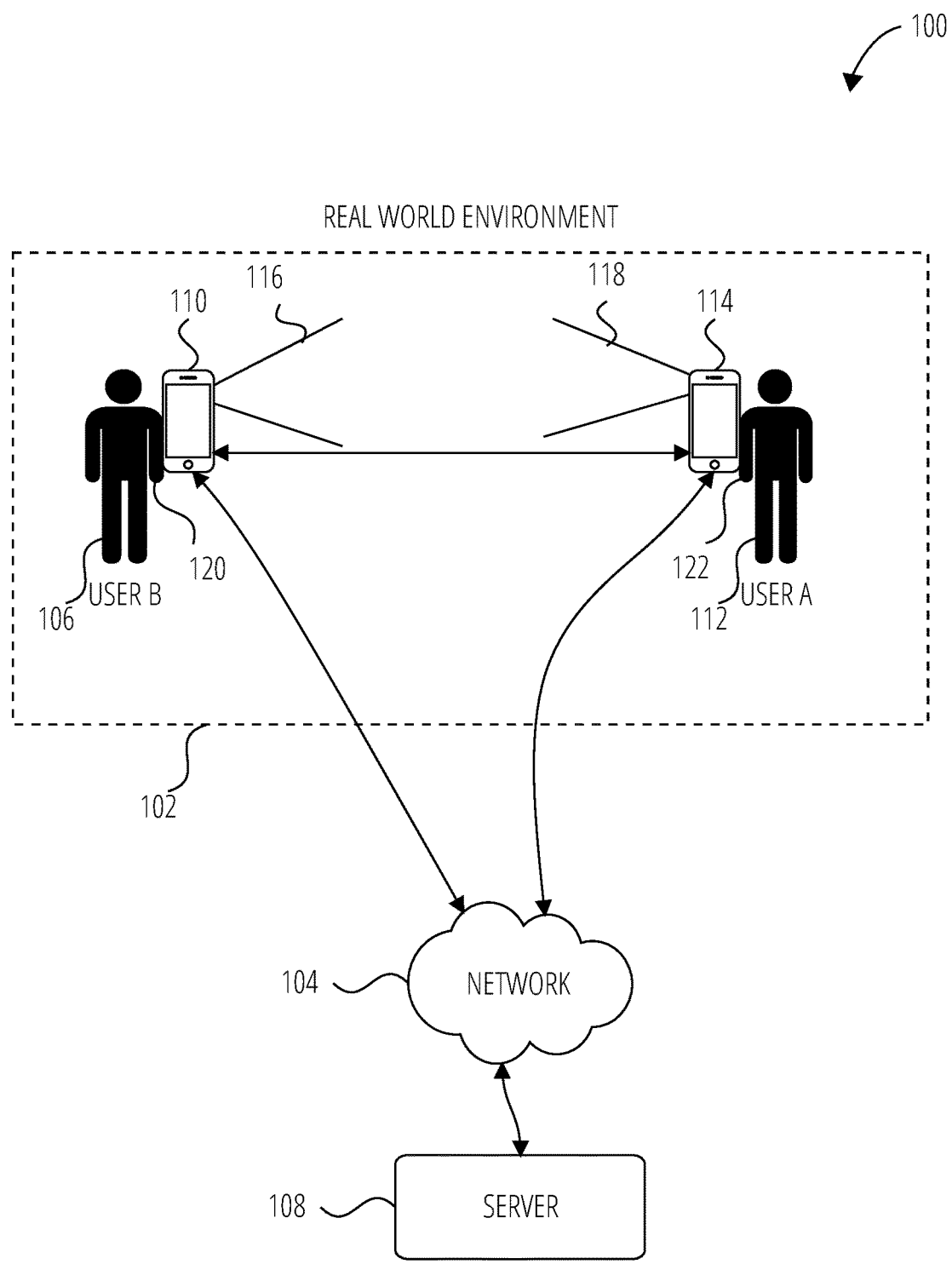
FIG. 1 is a block diagram illustrating a network environment for sharing augmented reality experience in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a Simultaneous Localization and Mapping (SLAM) system and/or a VIO system that relies on data acquired from multiple sensors (e.g., depth cameras, inertial sensors). The 6DOF tracking system analyzes data from the sensors to accurately determine the pose of the display device.

The term "handheld device" is used herein to refer to a computing device that can be held by the hands of a user. The handheld device includes a display, a camera, and a computing unit that operates an AR application. The handheld device further includes a 6DOF tracking system that tracks rotational and translational ego-motion.

Each handheld device may include its own 6DOF tracking system that generates its own reference coordinate system/frame. As such, two or more handheld devices may have two or more different reference coordinate systems that are to be aligned to express the pose of any of the handheld devices in a common coordinate system. Standard solutions include area scanning and the use of a fiducial marker (e.g., a predefined 2D image) to align the coordinate systems of each handheld device.

In one example, the present application describes a system for aligning the reference Coordinate Systems (CS) of 6DOF trackers of the two or more handheld devices. For example, one handheld device tracks another handheld device to align the coordinate systems of two devices to share an AR experience. The relation from the tracked point to the other device's coordinate origin is found implicitly based on hand-tracking of the other user's hand holding the other device. As such, the presently described method establishes a common coordinate system by only looking at the other device instead of detecting markers, surrogate objects, or the scene. The pose of both handheld devices can be expressed in a common CS, or in two different yet aligned CS. The common CS is referred to as a reference CS and a world CS. The system determines a relative pose between the handheld devices and uses the relative pose to align in 3D the VIO reference coordinate frames of the handheld devices for shared AR experiences.

In one example embodiment, a method for aligning coordinate systems from two or more separate handheld devices is described. In one aspect, the method includes accessing first pose data of a first handheld device, receiving second pose data of a second handheld device, detecting, from the first handheld device, hand-tracking data of a second user holding the second handheld device, and aligning a first coordinate system of the first handheld device with a second coordinate system of the second handheld device based on the first pose data, the second pose data, and the hand-tracking data of the second user holding the second handheld device.

As a result, one or more of the methodologies described herein facilitate solving the technical problem of resource management from aligning coordinate systems from separate augmented reality (AR) devices. The presently described method provides an improvement to an operation of the functioning of a computer by providing power consumption reduction. Other improvements include elimination of environmental mapping, fiduciary markers (e.g., QR code), or specific hand gestures. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating a handheld device B 110, handheld device A 114, and a server 108, according to some example embodiments. The network environment 100 includes the handheld device B 110, the handheld device A 114, and optionally the server 108, communicatively coupled to each other via a network 104 (or via other wireless communication means). The handheld device B 110, handheld device A 114, and the server 108 may each be implemented in a computer system, in whole or in part, as described below with respect to FIG. 12. The server 108 may be part of a network-based system. For example, the network-based system may be or include a cloud-based server system that provides additional information, such alignment data of the handheld device B 110 and handheld device A 114.

A user B 106 holds with his/her hand 120 the handheld device B 110. The user B 106 may be a human user (e.g., a human being), a machine user (e.g., a computer configured by a software program to interact with the handheld device B 110), or any suitable combination thereof (e.g., a human assisted by a machine, or a machine supervised by a human). The user B 106 holds the handheld device B 110 and points a rear-facing camera (not shown) of the handheld device B 110 towards the handheld device A 114 and the user A 112 in the real-world environment 102. The field of view 116 of the rear-facing camera of handheld device B 110 captures an image of the hand 122 of the user A 112 holding the handheld device A 114.

User A 112 holds with his/her hand 122 the handheld device A 114. The user A 112 points a rear-facing camera (not shown) of the handheld device A 114 towards the handheld device B 110 and the user B 106 in the real-world environment 102. The field of view 118 of the rear-facing camera of handheld device A 114 captures an image of the hand 120 of the user B 106 holding the handheld device B 110.

The handheld device B 110 includes a tracking system (not shown). The tracking system tracks the pose (e.g., position and orientation) of the handheld device B 110 relative to the real-world environment 102 using a 6DoF system or a combination of optical sensors (e.g., image camera), inertia sensors (e.g., gyroscope, accelerometer), wireless sensors (Bluetooth, Wi-Fi), GPS sensor, and audio sensor to determine the location of the handheld device B 110 within the real world environment 102. In one example, the handheld device B 110 uses its 6DoF system to generate pose data of the handheld device B 110.

The handheld device A 114 also includes its own tracking system (not shown). The tracking system tracks the pose (e.g., position and orientation) of the handheld device A 114 relative to the real-world environment 102 using its own 6DoF system or a combination of optical sensors (e.g., image camera), inertia sensors (e.g., gyroscope, accelerometer), wireless sensors (Bluetooth, Wi-Fi), GPS sensor, and audio sensor to determine the location of the handheld device A 114 within the real world environment 102. In one example, the handheld device A 114 uses its 6DoF system to generate pose data of the handheld device A 114.

In one example embodiment, the handheld device A 114 communicates its pose data to handheld device B 110 (e.g., via the network 104 and server 108, or directly to handheld device B 110). In one example, the handheld device B 110 computes the relative pose between the handheld device B 110 and the handheld device A 114 and communicates the relative pose to the handheld device A 114 via the server 108. In another example, the computation of the relative pose may be performed on the handheld device B 110, the server 108, or a combination of the handheld device B 110 and server 108.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5 and FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 108), databases, and devices (e.g., handheld device B 110, handheld device A 114). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
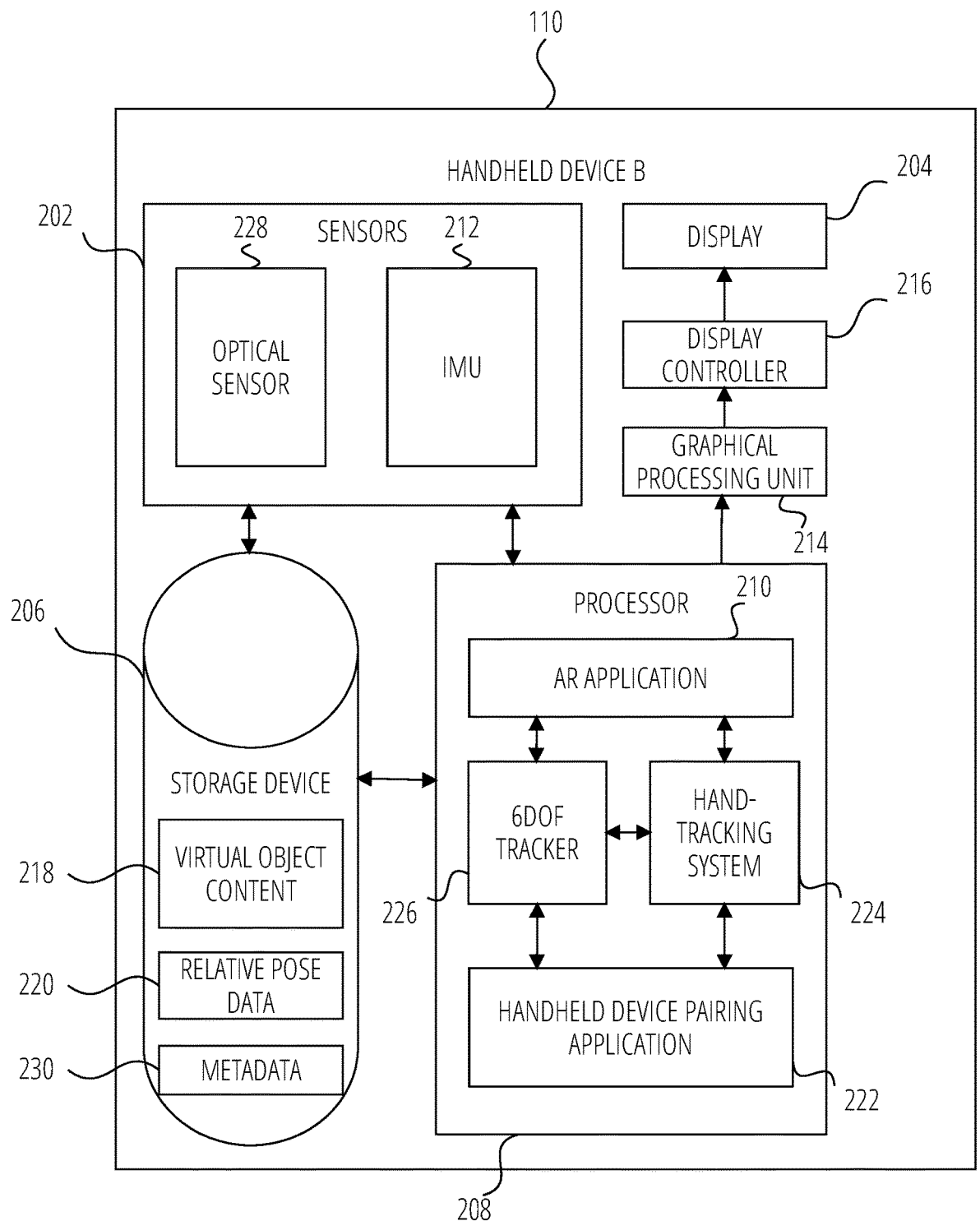
FIG. 2 is a block diagram illustrating a handheld device in accordance with one example embodiment.

FIG. 2 is a block diagram illustrating modules (e.g., components) of the handheld device B 110, according to some example embodiments. The handheld device B 110 includes sensors 202, a display 204, a processor 208, a graphical processing unit 214, a display controller 216, and a storage device 206. Examples of the handheld device B 110 include a tablet computer, or a smart phone.

The sensors 202 include an optical sensor 228 and an IMU 212 (Inertial Motion Unit). The optical sensor 228 includes a camera. The IMU 212 includes a combination of gyroscope, accelerometer, magnetometer. Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above. Other examples of sensors 202 include a depth sensor such as a structured-light sensor, a time-of-flight sensor, passive stereo sensor, and an ultrasound device, time-of-flight sensor.

The display 204 includes a screen or monitor configured to display images generated by the processor 208. In one example embodiment, the display 204 includes a (non-transparent) touchscreen display.

The processor 208 includes an AR application 210, a 6DOF tracker 226, a hand-tracking system 224, and a handheld device pairing application 222. The AR application 210 detects and identifies a physical environment, and items (e.g., a physical object) in the physical environments using computer vision. The AR application 210 retrieves a virtual object (e.g., 3D object model) based on the identified item or physical environment. The display 204 displays the virtual object. The AR application 210 includes a local rendering engine that generates a visualization of a virtual object overlaid (e.g., superimposed upon, or otherwise displayed in tandem with) on an image of the item captured by the optical sensor 228. The AR application 210 displays the virtual object such that the virtual object appears anchored to an item in the physical environment. A visualization of the virtual object may be manipulated by adjusting a position of the item (e.g., its physical location, orientation, or both) relative to the optical sensor 228. Similarly, the visualization of the virtual object may be manipulated by adjusting a pose of the handheld device B 110 relative to the item.

The 6DOF tracker 226 estimates a pose of the handheld device B 110. For example, the 6DOF tracker 226 uses image data and corresponding inertial data from the optical sensor 228 and the IMU 212 to track a location and pose of the handheld device B 110 relative to a frame of reference (e.g., real world environment 102). In one example, the 6DOF tracker 226 uses the sensor data to determine the three-dimensional pose of the handheld device B 110. The three-dimensional pose is a determined orientation and position of the handheld device B 110 in relation to the user's real-world environment 102. For example, the handheld device B 110 may use images of the user's real-world environment 102, as well as other sensor data to identify a relative position and orientation of the handheld device B 110 from physical objects in the real world environment 102 surrounding the handheld device B 110. The 6DOF tracker 226 continually gathers and uses updated sensor data describing movements of the handheld device B 110 to determine updated three-dimensional poses of the handheld device B 110 that indicate changes in the relative position and orientation of the handheld device B 110 from the physical objects in the real-world environment 102. The 6DOF tracker 226 provides the three-dimensional pose of the handheld device B 110 to the hand-tracking system 224 and the handheld device pairing application 222.

The hand-tracking system 224 allows users to use their hands to interact with computers, without the need for touch, controllers or devices. The hand-tracking system can operate to estimate sparse hand skeleton by using the following:

Acquire input images: using a camera module that captures the movements of the hands with high accuracy.

Image correction: apply image processing techniques for lens distortion removal, etc.

Hand detection: locate and segment the hand region from the background using color and depth data (e.g., sparse point cloud).

Feature extraction: extract and match features across frames and construct optical flow field.

Hand pose estimation: estimate the position and orientation of the hand joints and bones using a skeletal model.

Gesture recognition: classify the hand pose into a predefined gesture using machine learning algorithms.

The hand-tracking system 224 can provide data on position and rotation of every finger, the entire palm, and hand gestures. Example components of the hand-tracking system 224 are described further below with respect to FIG. 3.

The handheld device pairing application 222 accesses pose data from the 6DOF tracker 226, receives pose data from handheld device A 114, accesses hand tracking information of hand 122 of user A 112, and pairs the coordinate systems of the handheld device B 110 with the handheld device A 114 based on pose data from the 6DOF tracker 226, pose data from handheld device A 114, and hand tracking information. Example components of the handheld device pairing application 222 are described further below with respect to FIG. 4.

The AR application 210 uses the relative pose to enable sharing of AR experience between handheld device B 110 and handheld device A 114. For example, the correct location/perspective of a virtual object is accurately presented in both the handheld device B 110 and the handheld device A 114 (e.g., user B 106 points to a country on a virtual globe using the handheld device B 110, the handheld device A 114 displays the virtual globe so that the user B 106 appears pointing to the same country (as perceived from the perspective of the handheld device A 114). Example components of the handheld device pairing application 222 are described further below with respect to FIG. 4.

The graphical processing unit 214 includes a render engine (not shown) that is configured to render a frame of a 3D model of a virtual object based on the virtual content provided by the AR application 210 and the pose of the handheld device B 110 (relative to the handheld device A 114). In other words, the graphical processing unit 214 uses the three-dimensional pose of the handheld device B 110 to generate frames of virtual content to be presented on the display 204. For example, the graphical processing unit 214 uses the three-dimensional pose to render a frame of the virtual content such that the virtual content is presented at an orientation and position in the display 204 to properly augment the user B 106's reality. As an example, the graphical processing unit 214 may use the three-dimensional pose data to render a frame of virtual content such that, when presented on the display 204, the virtual content overlaps/appears anchored to a physical object in the user B 106's real world environment 102. The graphical processing unit 214 generates updated frames of virtual content based on updated three-dimensional poses of the handheld device B 110, which reflect changes in the position and orientation of the user B 106's in relation to physical objects in the user B 106's real world environment 102.

The graphical processing unit 214 transfers the rendered frame to the display controller 216. The display controller 216 is positioned as an intermediary between the graphical processing unit 214 and the display 204, receives the image data (e.g., rendered frame) from the graphical processing unit 214, and provides the rendered frame to display 204.

The storage device 206 stores virtual object content 218, relative pose data 220 (e.g., relative pose between handheld device B 110 and handheld device A 114, common reference frame), and metadata 230. The virtual object content 218 includes, for example, a database of visual references (e.g., images, QR codes) and corresponding virtual content (e.g., three-dimensional model of virtual objects). The relative pose data 220 indicate relative pose between a reference coordinate frame of the handheld device B 110 and a reference coordinate frame of the handheld device A 114.

The metadata 230 includes, for example, factory calibration parameters of the handheld device B 110, calibration parameters based on the location of the optical sensor 228 of the handheld device B 110 relative to the display 204, and time information. In other examples, the metadata 230 includes VIO calibration parameters related to IMU intrinsics, image sensor intrinsics, IMU-image-sensor extrinsics, and IMU-image-sensor time alignment parameters.

For example, the calibration parameters can include intrinsic calibration parameters of the IMU 212 (sometimes referred to herein as "IMU intrinsics'"). Examples of calibration parameters that are considered IMU intrinsics include gyroscope scale, gyroscope skewness, accelerometer scale, accelerometer skewness, accelerometer misalignment, gyroscope misalignment, rotation quaternion between the gyroscope and the accelerometer (e.g., "gyro-scope-accelerometer rotation quaternion"), gyroscope bias, and accelerometer bias.

The calibration parameters can include intrinsic calibration parameters of the optical sensor 228 (sometimes referred to herein as "camera intrinsics"). Examples of calibration parameters that are considered camera intrinsics include focal length and the optical center of the optical sensor 228.

The calibration parameters can include extrinsic calibration parameters corresponding to the IMU 212 and the optical sensor 228 (sometimes referred to herein as "IMU-camera extrinsics'"). Typically, an unknown transformation exists between the reference frame of the IMU 212 (the "IMU reference frame") and the reference frame of the image sensor (the "camera frame"), and this transformation can be expressed by a rotation quaternion corresponding to the rotation from the optical reference frame to the IMU reference frame and a translation vector corresponding and translation vector corresponding to a translation from the IMU-derived 3D position of handheld device B 110 to the optical reference frame. This rotation quaternion and translation vector are examples of calibration parameters that are considered IMU-camera extrinsics.

The calibration parameters can include calibration parameters for performing time alignment between the IMU 212 and the optical sensor 228 (sometimes referred to herein as "IMU-camera time alignment parameters"). An example of a calibration parameter that is considered to be an IMU-camera time alignment parameters includes the time offset between the IMU 212 and the optical sensor 228 (e.g., between time-stamps generated respectively).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
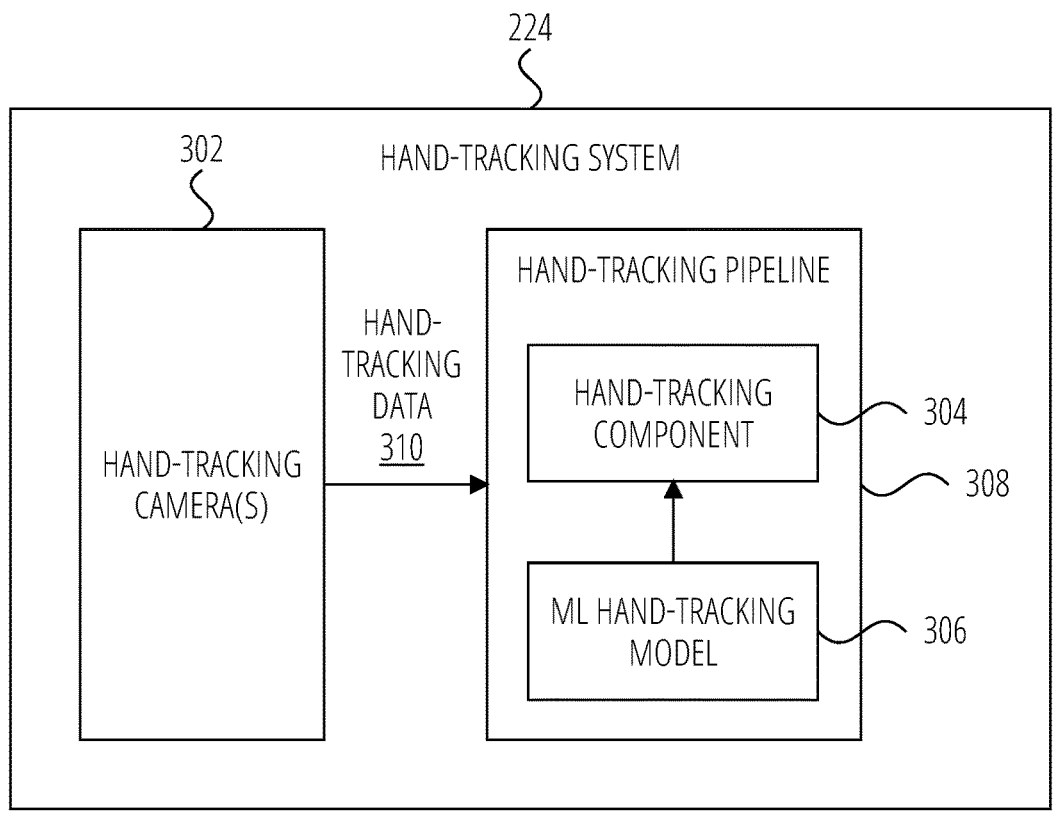
FIG. 3 is a block diagram illustrating components of a hand-tracking system in accordance with one example embodiment.

FIG. 3 is a block diagram illustrating components of the hand-tracking system 224 in accordance with one example embodiment. The hand-tracking system 224 detects hand poses of the user A 112 holding the handheld device A 114. For example, the hand-tracking system 224 uses one or more hand-tracking camera(s) 302 to capture tracking video frame data of hand poses of the user A 112. The hand-tracking camera(s) 302 communicate the tracking video frame data to a hand-tracking component 304 of a hand-tracking pipeline 308.

The hand-tracking component 304 receives the tracking video frame data and generates hand-tracking data 310 based on the tracking video frame data. The hand-tracking data 310 comprises skeletal model data of one or more skeletal models of the hand 122 of user A 112 in a 3D coordinate system based on the landmark features extracted from the tracking video frame data, and hand pose categorization data of a hand pose made by the user A 112's hand. The skeletal models comprise skeletal model features that correspond to recognized visual landmarks of portions of the hand 122 of the user A 112. In some examples, the hand-tracking data 310 includes landmark data such as landmark identification, a physical location of the landmark, links between joints of the user's fingers and categorization information of one or more landmarks associated with the hand 122 of the user A 112. In some examples, the hand pose categorization data includes an indication of a hand pose or gesture being made by the hand 122 of user A 112.

For example, the hand-tracking component 304 recognizes landmark features on portions of the hand 122 of user A 112 captured in the tracking video frame data. In some examples, the hand-tracking component 304 extracts landmarks of the hand 122 of user A 112 from the tracking video frame data using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

In other examples, the hand-tracking component 304 generates the hand pose categorization data and the sequence of skeletal models of hand-tracking data 310 based on the landmarks extracted from the tracking video frame data using artificial intelligence methodologies and an ML hand-tracking model 306 that was previously generated using machine learning methodologies. In some examples, the ML hand-tracking model 306 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 306 may include, but are not limited to, supervised learning, unsupervised learning, semi-supervised learning, reinforcement learning, dimensionality reduction, self-learning, feature learning, sparse dictionary learning, and anomaly detection.

In some examples, the hand-tracking component 304 generates the hand pose categorization data and the sequence of skeletal models of the hand-tracking data 310 based on the landmarks extracted from the tracking video frame data using geometric methodologies.

Figure 4:
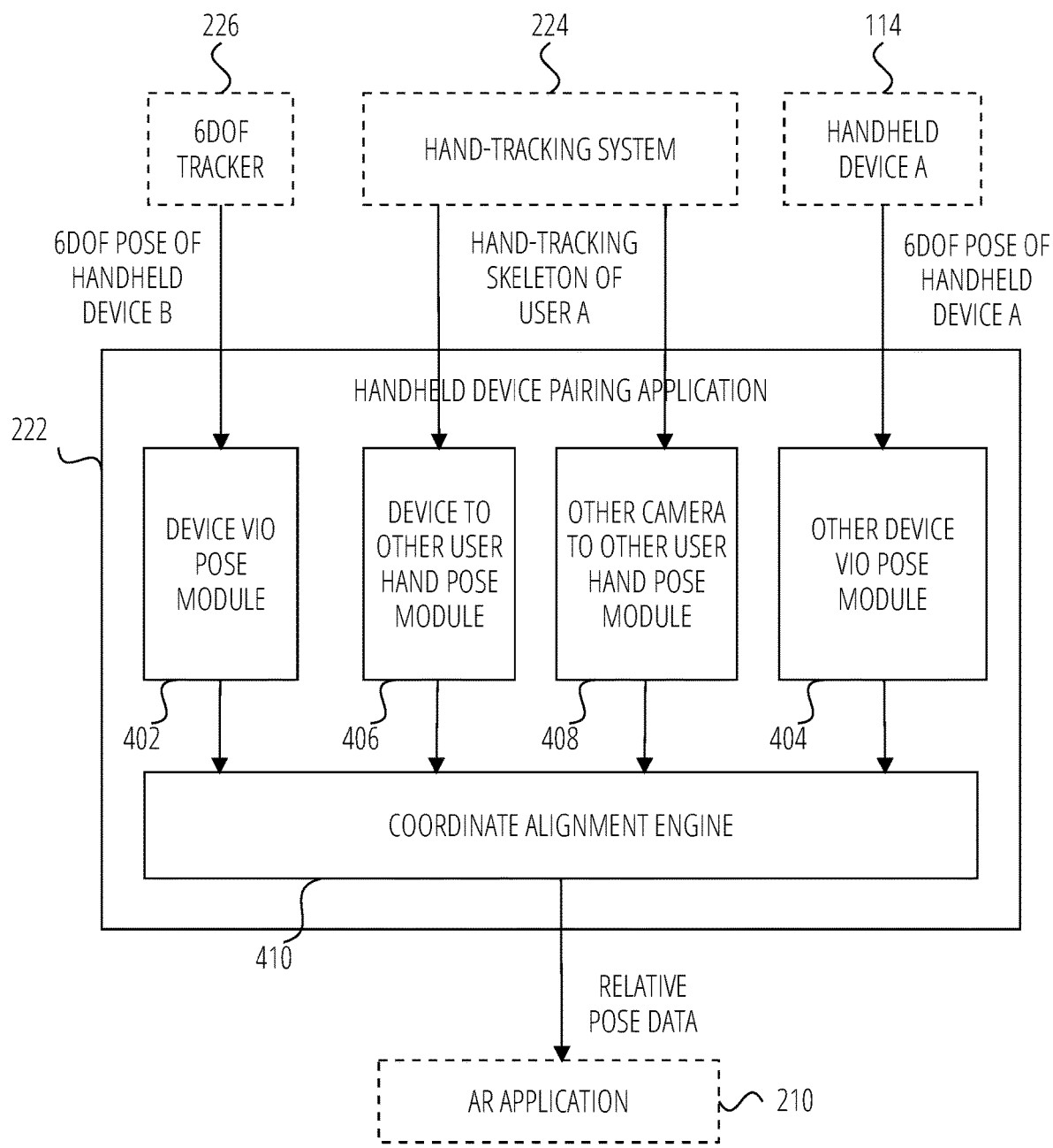
FIG. 4 is a block diagram illustrating components of a handheld device pairing application in accordance with one example embodiment.

FIG. 4 is a block diagram illustrating the handheld device pairing application 222 in accordance with one example embodiment. The handheld device pairing application 222 includes a device VIO pose module 402, device to other user hand pose module 406, other camera to other user hand pose module 408, other device VIO pose module 404, and coordinate alignment engine 410.

The device VIO pose module 402 accesses 6DOF pose data from the 6DOF tracker 226. The other device VIO pose module 404 receives 6DOF pose data from handheld device A 114. The device to other user hand pose module 406 accesses hand-tracking data (of hand 122 of user A 112) from the hand-tracking system 224. For example, the device to other user hand pose module 406 identifies a 2D observation of hand joint of handheld device A 114 as seen by handheld device B 110. Any hand joint can be used.

The other camera to other user hand pose module 408 identifies a coordinate transformation between the hand-tracking data and the 6DOF pose data of handheld device A 114. In one example, the other camera to other user hand pose module 408 transforms coordinate systems between the hand 122 and the device's coordinate system reference (e.g., IMU of handheld device A 114). In other examples, the estimation of the transformation can be performed using a soft constraint on the lever arm. In one example, the hand-tracking component 304 estimates the transform (hand to camera) by tracking the hand over multiple frames. The hand-tracking component 304 assumes that there is a rigid offset between the camera and the hand (e.g., users do not hold their handheld devices differently during pairing). This unknown vector is then added to a solver (described further below with respect to FIG. 7) that solves for (a) the alignment between the devices (e.g., handheld device A 114 and handheld device B 110) and (b) the unknown lever arm between the camera (e.g., camera of handheld device A 114 and the hand 122). It is noted that the hand-tracking system 224 uses the handheld device A 114's displacement (movement) to solve the problem.

The coordinate alignment engine 410 aligns the coordinate systems of the handheld device B 110 with handheld device A 114 based on the 6DOF pose of handheld device B 110, the 6DOF pose of handheld device A 114, the hand-tracking data, and the transformation between the hand-tracking data and the handheld device A 114's coordinate system. In one example, the coordinate alignment engine 410 determines a relative pose between the handheld device A 114 and handheld device B 110. The coordinate alignment engine 410 sends the relative pose data to the AR application 210. The AR application 210 uses the relative pose data to enable accurate sharing of AR experience between the handheld device B 110 and the handheld device A 114 by "synchronizing"/"aligning" the frame of references of each device. For example, the location/perspective of a virtual object is presented within a common frame of reference in both the handheld device B 110 and the handheld device A 114.

The AR application 210 uses the relative pose to align in the VIO reference coordinate frames of each AR device. It is noted that once the alignment is performed, the handheld device B 110 and handheld device A 114 are considered "paired" because they share a common reference frame. Once paired, the AR devices (e.g., handheld device B 110 and handheld device A 114) do not need to be synced again. As such, the relative pose computation is performed only when the handheld device B 110 and handheld device A 114 are connected during a joint collaborative AR session (e.g., each AR device view a "same" virtual object in the real-world environment 102). In another example, the coordinate alignment engine 410 provides alignment data (e.g., relative pose of handheld device B 110 relative to handheld device A 114) to the graphical processing unit 214 for accurate placement/display of a virtual object.

Figure 5:
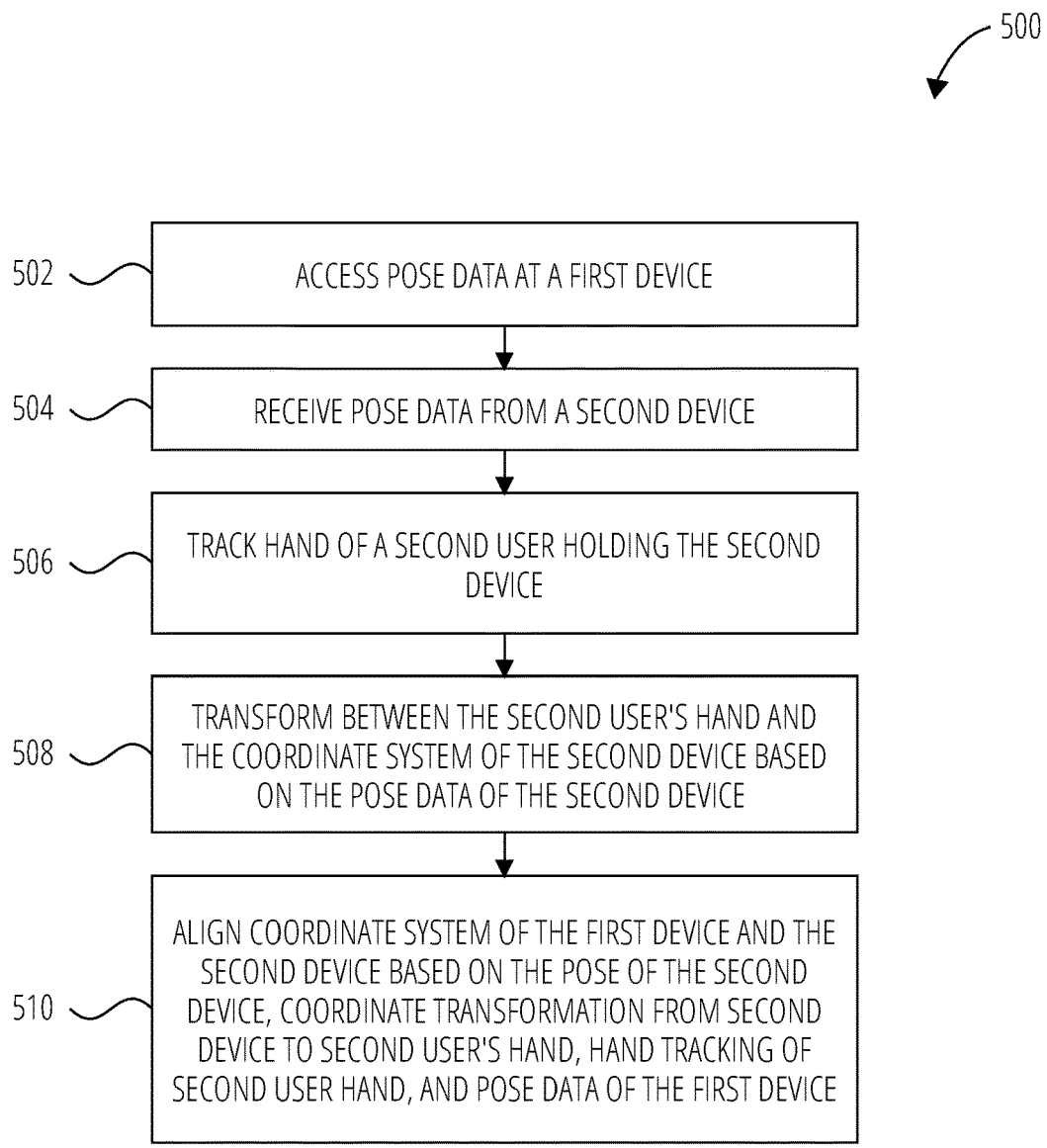
FIG. 5 is a flow diagram illustrating a method for aligning coordinate systems of handheld devices in accordance with one example embodiment.

FIG. 5 is a flow diagram illustrating a method for aligning coordinate systems of handheld devices in accordance with one example embodiment. Two or more user devices use the alignment process to align themselves based on a common reference coordinate system. Operations in the method 500 may be performed by the handheld device B 110, using components (e.g., modules, engines) described above with respect to FIG. 2, FIG. 3, and FIG. 4. Accordingly, the method 500 is described by way of example with reference to the handheld device B 110. However, it shall be appreciated that at least some of the operations of the method 500 may be deployed on various other hardware configurations or be performed by similar components residing elsewhere.

At block 502, the handheld device B 110 accesses pose data from the 6DOF tracker 226. In one example, the device VIO pose module 402 accesses pose data from the 6DOF tracker 226.

At block 504, the handheld device B 110 receives pose data from the handheld device A 114. In one example, the other device VIO pose module 404 receives pose data from handheld device A 114.

At block 506, the handheld device B 110 tracks the hands of the user A 112 holding the handheld device A 114. In one example, the hand-tracking system 224 performs the hand-tracking process.

At block 508, the handheld device B 110 transforms coordinate systems between the hands of the user A 112 and the coordinate systems of the handheld device A 114 (based on the pose data of the handheld device A 114). In one example, the device to other user hand pose module 406 performs operations of block 508.

At block 510, the handheld device B 110 aligns the coordinate systems of the handheld device B 110 with handheld device A 114 based on the pose data of both handheld device B 110 and handheld device A 114, and the coordinate transformation based on the hand-tracking. In one example, the coordinate alignment engine 410 performs the operations of block 510. For example, the coordinate alignment engine 410 aligns itself to the handheld device A 114 based on relative position data. For example, the coordinate alignment engine 410 uses relative position data to create a transformation matrix that transforms locations in coordinate system of handheld device A 114 into locations in coordinate system of handheld device B 110. In subsequent operations, the handheld device B 110 applies the transformation matrix to subsequent 6DoF data received from the IMU 212 to calculate the location and orientation (pose) of the handheld device B 110.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
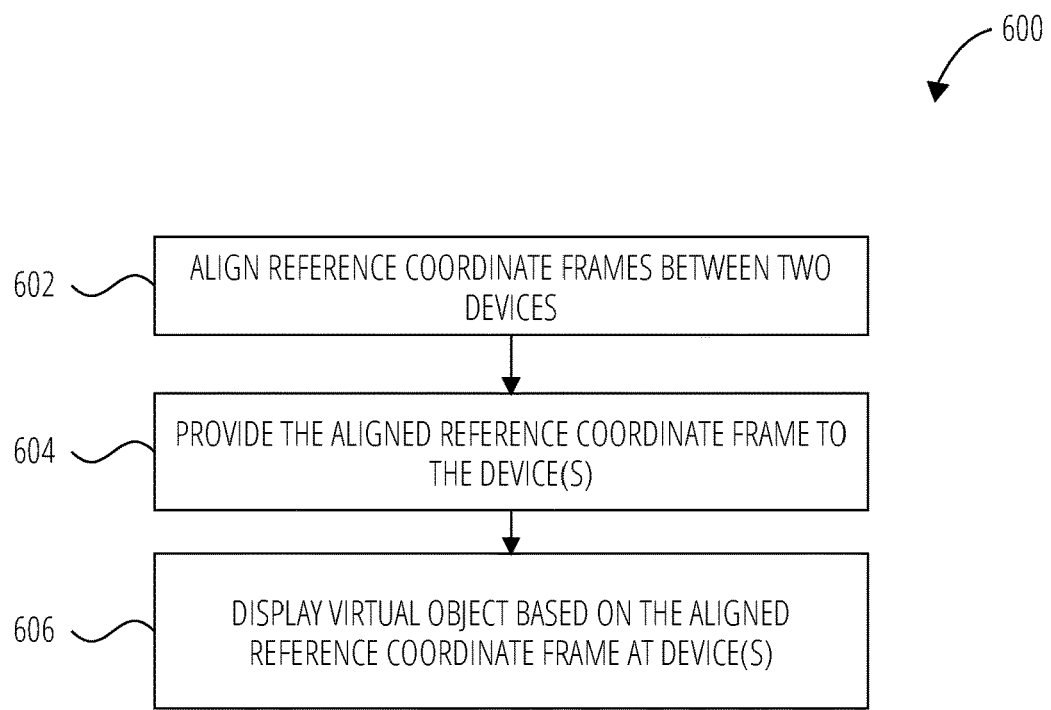
FIG. 6 is a flow diagram illustrating a method for displaying virtual object based on aligned reference coordinate frame in accordance with one example embodiment.

FIG. 6 is a flow diagram illustrating a method for displaying virtual object based on aligned reference coordinate frame in accordance with one example embodiment. Operations in the method 600 may be performed by the handheld device B 110, using components (e.g., modules, engines) described above with respect to FIG. 2-FIG. 4. Accordingly, the method 600 is described by way of example with reference to the handheld device B 110. However, it shall be appreciated that at least some of the operations of the method 600 may be deployed on various other hardware configurations or be performed by similar components residing elsewhere.

According to some examples, the method includes aligning reference coordinate frames between two devices at block 602. Operations at block 602 can be performed by handheld device pairing application 222.

According to some examples, the method includes providing the aligned reference coordinate frame to the device(s) at block 604. Operations at block 604 can be performed by handheld device pairing application 222.

According to some examples, the method includes displaying virtual object based on the aligned reference coordinate frame at device(s) at block 606. Operations at block 606 can be performed by AR application 210.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
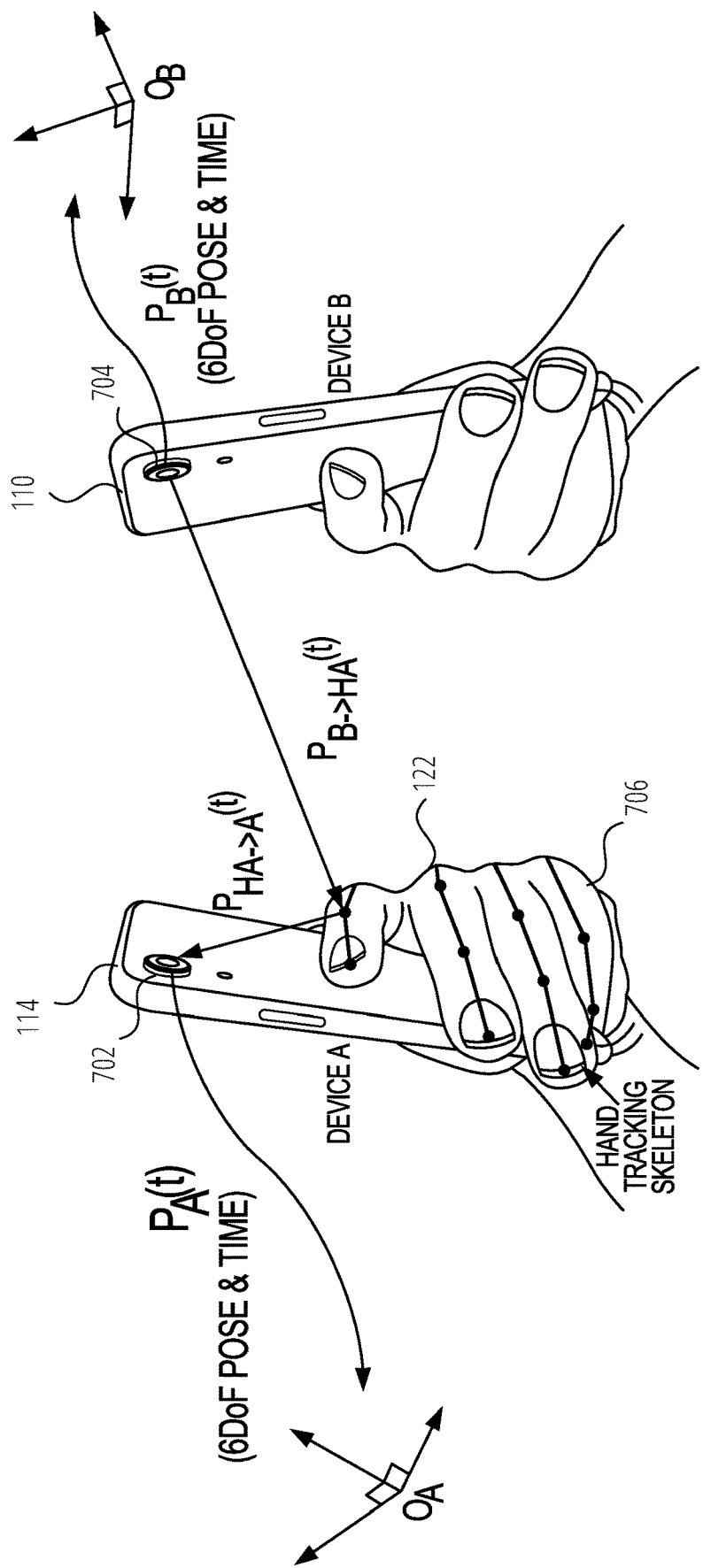
FIG. 7 illustrates aligning two coordinate systems of two handheld devices in accordance with one example embodiment.

FIG. 7 is a block diagram illustrating aligning two coordinate systems of two handheld devices in accordance with one example embodiment. In one example, FIG. 7 illustrates an environment in which multiple users are collaborating. Each user has an AR device for viewing the environment and AR elements or objects. User B 106 and user A 112 are facing each other.

Each user device (e.g., handheld device B 110 and handheld device A 114) captures an image of the hand from their perspective, where handheld device B 110 captures an image of the hand 122 of user A 112 and handheld device A 114 captures an image of the hand 120 of user B 106.

$P_A(t)$ represents the relative 6DOF pose at time (t). $P_A(t)$ is identified on handheld device A 114 (using the 6DOF tracker of handheld device A 114) and is transferred/communicated to handheld device B 110.

$P_B(t)$ represents the relative 6DoF pose at time (t). The 6DOF tracker 226 determines the 6DoF pose on handheld device B 110 (using the 6DOF tracker 226).

$P_{B \to HA}(t)$ represents the 2D observation of hand-joint of handheld device A 114 as seen by handheld device B 110. This operation can be performed by hand-tracking system 224 and device to other user hand pose module 406.

$P_{HA \to A}(t)$ represents the transform between the hand 122 and the device's coordinate system reference (e.g., IMU of handheld device A 114). The operation can be performed by other camera to other user hand pose module 408.

Alignment of handheld device B 110 and handheld device A 114 involves adopting a common coordinate system and mapping of locations and measurements in $CS_A$ (of handheld device A 114) to $CS_B$ (of handheld device B 110). Measurements of poses of each handheld device are now made in a common coordinate system and users may collaborate in the AR/VR environment.

Networked Computing Environment

Figure 8:
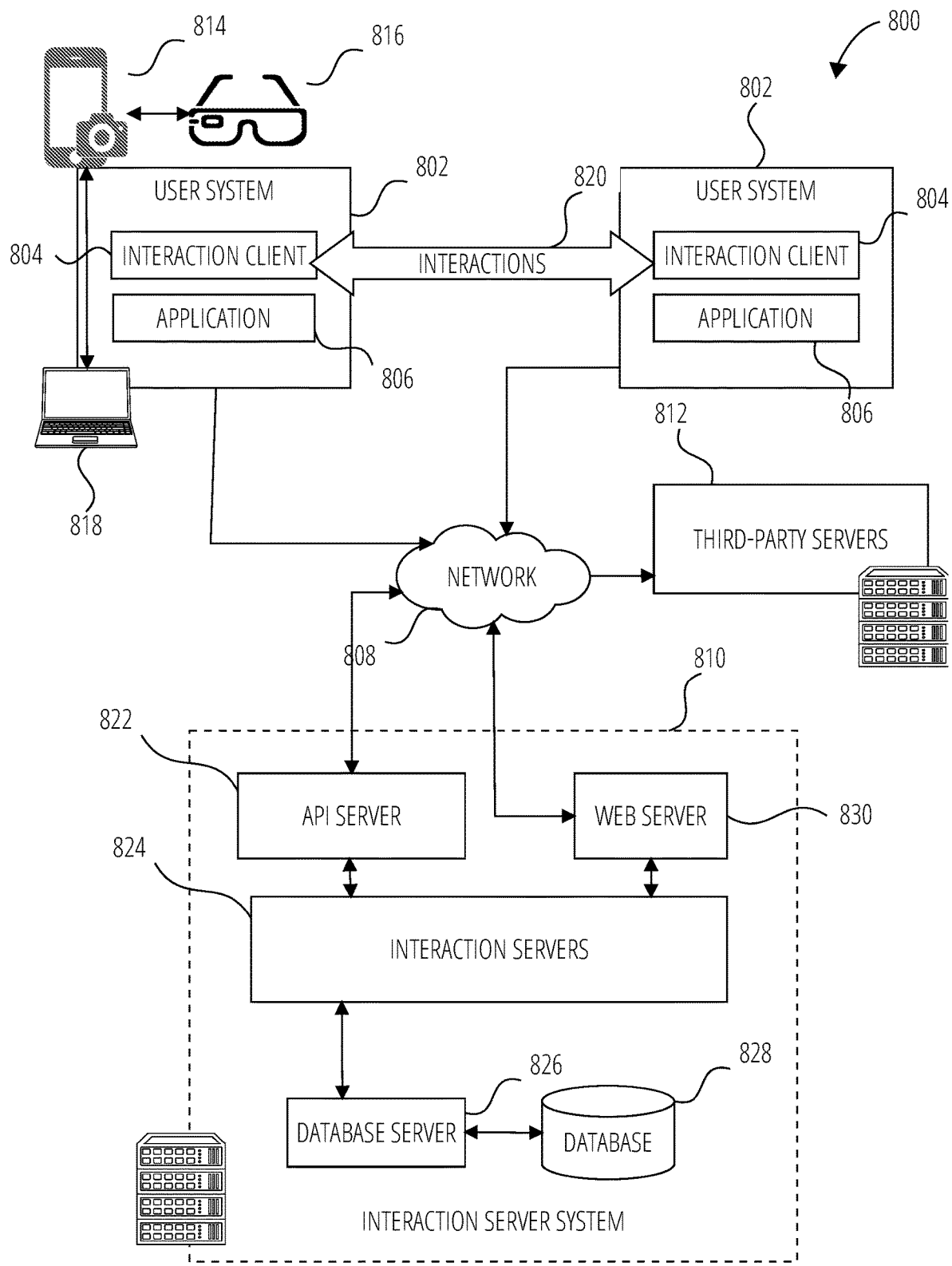
FIG. 8 is a diagrammatic representation of a networked environment in which the present disclosure may be deployed, according to some examples.

FIG. 8 is a block diagram showing an example interaction system 800 for facilitating interactions (e.g., exchanging text messages, conducting text audio and video calls, or playing games) over a network. The interaction system 800 includes multiple user systems 802, each of which hosts multiple applications, including an interaction client 804 and other applications 806. Each interaction client 804 is communicatively coupled, via one or more Communication Networks including a network 808 (e.g., the Internet), to other instances of the interaction client 804 (e.g., hosted on respective other user systems 102), an interaction server system 810 and third-party servers 812). An interaction client 804 can also communicate with locally hosted applications 806 using Applications Program Interfaces (APIs).

Each user system 802 may include multiple user devices, such as a mobile device 814, head-wearable apparatus 816, and a computer client device 818 that are communicatively connected to exchange data and messages.

An interaction client 804 interacts with other interaction clients 804 and with the interaction server system 810 via the network 808. The data exchanged between the interaction clients 804 (e.g., interactions 820) and between the interaction clients 804 and the interaction server system 810 includes functions (e.g., commands to invoke functions) and payload data (e.g., text, audio, video, or other multimedia data).

The interaction server system 810 provides server-side functionality via the network 808 to the interaction clients 804. While certain functions of the interaction system 800 are described herein as being performed by either an interaction client 804 or by the interaction server system 810, the location of certain functionality either within the interaction client 804 or the interaction server system 810 may be a design choice. For example, it may be technically preferable to initially deploy particular technology and functionality within the interaction server system 810 but to later migrate this technology and functionality to the interaction client 804 where a user system 802 has sufficient processing capacity.

The interaction server system 810 supports various services and operations that are provided to the interaction clients 804. Such operations include transmitting data to, receiving data from, and processing data generated by the interaction clients 804. This data may include message content, client device information, geolocation information, media augmentation and overlays, message content persistence conditions, entity relationship information, and live event information. Data exchanges within the interaction system 800 are invoked and controlled through functions available via user interfaces (UIs) of the interaction clients 804.

Turning now specifically to the interaction server system 810, an Application Program Interface (API) server 822 is coupled to and provides programmatic interfaces to interaction servers 824, making the functions of the interaction servers 824 accessible to interaction clients 804, other applications 806 and third-party server 812. The interaction servers 824 are communicatively coupled to a database server 826, facilitating access to a database 828 that stores data associated with interactions processed by the interaction servers 824. Similarly, a web server 830 is coupled to the interaction servers 824 and provides web-based interfaces to the interaction servers 824. To this end, the web server 830 processes incoming network requests over the Hypertext Transfer Protocol (HTTP) and several other related protocols.

The Application Program Interface (API) server 822 receives and transmits interaction data (e.g., commands and message payloads) between the interaction servers 824 and the user systems 802 (and, for example, interaction clients 804 and other application 806) and the third-party server 812. Specifically, the Application Program Interface (API) server 822 provides a set of interfaces (e.g., routines and protocols) that can be called or queried by the interaction client 804 and other applications 806 to invoke functionality of the interaction servers 824. The Application Program Interface (API) server 822 exposes various functions supported by the interaction servers 824, including account registration; login functionality; the sending of interaction data, via the interaction servers 824, from a particular interaction client 804 to another interaction client 804; the communication of media files (e.g., images or video) from an interaction client 804 to the interaction servers 824; the settings of a collection of media data (e.g., a story); the retrieval of a list of friends of a user of a user system 802; the retrieval of messages and content; the addition and deletion of entities (e.g., friends) to an entity relationship graph (e.g., the entity graph 1010); the location of friends within an entity relationship graph; and opening an application event (e.g., relating to the interaction client 804).

The interaction servers 824 host multiple systems and subsystems, described below with reference to FIG. 9.

Linked Applications

Returning to the interaction client 804, features and functions of an external resource (e.g., a linked application 806 or applet) are made available to a user via an interface of the interaction client 804. In this context, "external" refers to the fact that the application 806 or applet is external to the interaction client 804. The external resource is often provided by a third party but may also be provided by the creator or provider of the interaction client 804. The interaction client 804 receives a user selection of an option to launch or access features of such an external resource. The external resource may be the application 806 installed on the user system 802 (e.g., a "native app"), or a small-scale version of the application (e.g., an "applet") that is hosted on the user system 802 or remote of the user system 802 (e.g., on third-party servers 812). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 804. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 804 determines whether the selected external resource is a web-based external resource or a locally installed application 806. In some cases, applications 806 that are locally installed on the user system 802 can be launched independently of and separately from the interaction client 804, such as by selecting an icon corresponding to the application 806 on a home screen of the user system 802. Small-scale versions of such applications can be launched or accessed via the interaction client 804 and, in some examples, no or limited portions of the small-scale application can be accessed outside of the interaction client 804. The small-scale application can be launched by the interaction client 804 receiving, from a third-party server

812 for example, a markup-language document associated with the small-scale application and processing such a document.

In response to determining that the external resource is a locally installed application 806, the interaction client 804 instructs the user system 802 to launch the external resource by executing locally stored code corresponding to the external resource. In response to determining that the external resource is a web-based resource, the interaction client 804 communicates with the third-party servers 812 (for example) to obtain a markup-language document corresponding to the selected external resource. The interaction client 804 then processes the obtained markup-language document to present the web-based external resource within a user interface of the interaction client 804.

The interaction client 804 can notify a user of the user system 802, or other users related to such a user (e.g., "friends"), of activity taking place in one or more external resources. For example, the interaction client 804 can provide participants in a conversation (e.g., a chat session) in the interaction client 804 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 804, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 804. The external resource can selectively include different media items in the responses, based on a current context of the external resource.

The interaction client 804 can present a list of the available external resources (e.g., applications 806 or applets) to a user to launch or access a given external resource. This list can be presented in a context-sensitive menu. For example, the icons representing different ones of the application 806 (or applets) can vary based on how the menu is launched by the user (e.g., from a conversation interface or from a non-conversation interface).

System Architecture

Figure 9:
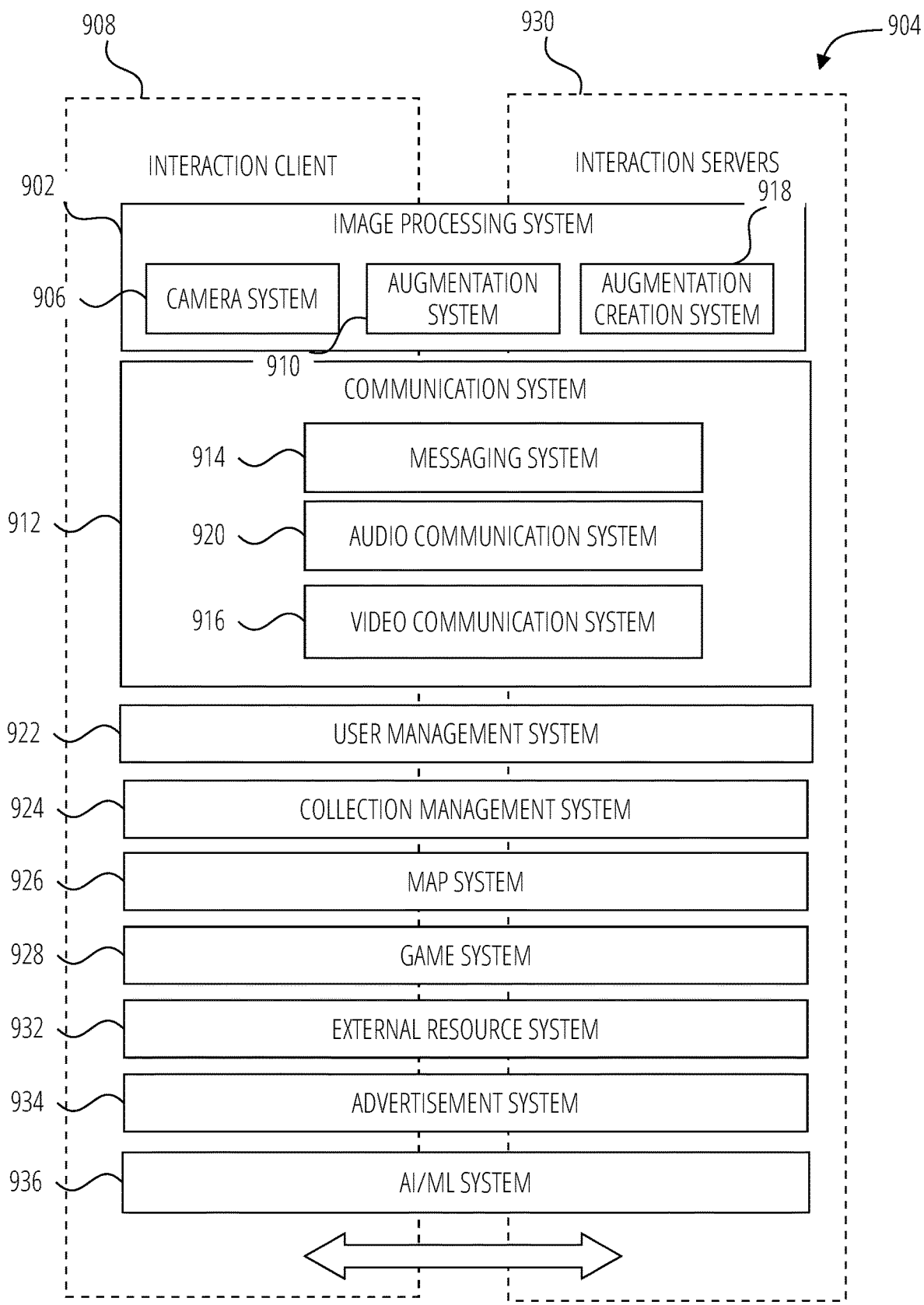
FIG. 9 is a diagrammatic representation of a messaging system that has both client-side and server-side functionality, according to some examples.

FIG. 9 is a block diagram illustrating further details regarding the interaction system 904, according to some examples. Specifically, the interaction system 904 is shown to comprise the interaction client 908 and the interaction servers 930. The interaction system 904 embodies multiple subsystems, which are supported on the client-side by the interaction client 908 and on the server-side by the interaction servers 930. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 904.

Data storage: A microservice subsystem may be responsible for its own data storage, which may be in the form of a database, cache, or other storage mechanism (e.g., using the database server 826 and database 828). This enables a microservice subsystem to operate independently of other microservices of the interaction system 904.

Service discovery: Microservice subsystems may find and communicate with other microservice subsystems of the interaction system 904. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 904 may employ a monolithic architecture, a service-oriented architecture (SOA), a function-as-a-service (FaaS) architecture, or a modular architecture:

Example subsystems are discussed below.

An image processing system 902 provides various functions that enable a user to capture and augment (e.g., annotate or otherwise modify or edit) media content associated with a message.

A camera system 906 includes control software (e.g., in a camera application) that interacts with and controls hardware camera hardware (e.g., directly or via operating system controls) of the user system 802 to modify and augment real-time images captured and displayed via the interaction client 908.

The augmentation system 910 provides functions related to the generation and publishing of augmentations (e.g., media overlays) for images captured in real-time by cameras of the user system 802 or retrieved from memory of the user system 802. For example, the augmentation system 910 operatively selects, presents, and displays media overlays (e.g., an image filter or an image lens) to the interaction client 908 for the augmentation of real-time images received via the camera system 906 or stored images retrieved from memory 1206 of a user system 802. These augmentations are selected by the augmentation system 910 and presented to a user of an interaction client 908, based on a number of inputs and data, such as for example:

Geolocation of the user system 802; and

Entity relationship information of the user of the user system 802.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 802 for communication in a message, or applied to video content, such as a video content stream or feed transmitted from an interaction client 908. As such, the image processing system 902 may interact with, and support, the various subsystems of the communication system 912, such as the messaging system 914 and the video communication system 916.

A media overlay may include text or image data that can be overlaid on top of a photograph taken by the user system 802 or a video stream produced by the user system 802. In some examples, the media overlay may be a location overlay (e.g., Venice beach), a name of a live event, or a name of a merchant overlay (e.g., Beach Coffee House). In further examples, the image processing system 902 uses the geolocation of the user system 802 to identify a media overlay that includes the name of a merchant at the geolocation of the user system 802. The media overlay may include other indicia associated with the merchant. The media overlays may be stored in the databases 828 and accessed through the database server 826.

The image processing system 902 provides a user-based publication platform that enables users to select a geolocation on a map and upload content associated with the selected geolocation. The user may also specify circumstances under which a particular media overlay should be offered to other users. The image processing system 902 generates a media overlay that includes the uploaded content and associates the uploaded content with the selected geolocation.

The augmentation creation system 918 supports augmented reality developer platforms and includes an application for content creators (e.g., artists and developers) to create and publish augmentations (e.g., augmented reality experiences) of the interaction client 908. The augmentation creation system 918 provides a library of built-in features and tools to content creators including, for example custom shaders, tracking technology, and templates.

In some examples, the augmentation creation system 918 provides a merchant-based publication platform that enables merchants to select a particular augmentation associated with a geolocation via a bidding process. For example, the augmentation creation system 918 associates a media overlay of the highest bidding merchant with a corresponding geolocation for a predefined amount of time.

A communication system 912 is responsible for enabling and processing multiple forms of communication and interaction within the interaction system 904 and includes a messaging system 914, an audio communication system 920, and a video communication system 916. The messaging system 914 is responsible for enforcing the temporary or time-limited access to content by the interaction clients 908. The messaging system 914 incorporates multiple timers (e.g., within an ephemeral timer system) that, based on duration and display parameters associated with a message or collection of messages (e.g., a story), selectively enable access (e.g., for presentation and display) to messages and associated content via the interaction client 908. The audio communication system 920 enables and supports audio communications (e.g., real-time audio chat) between multiple interaction clients 908. Similarly, the video communication system 916 enables and supports video communications (e.g., real-time video chat) between multiple interaction clients 908.

A user management system 922 is operationally responsible for the management of user data and profiles, and maintains entity information (e.g., stored in entity tables 1110, entity graphs 1010 and profile data 1002) regarding users and relationships between users of the interaction system 904.

A collection management system 924 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 924 may also be responsible for publishing an icon that provides notification of a particular collection to the user interface of the interaction client 908. The collection management system 924 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 924 employs machine vision (or image recognition technology) and content rules to curate a content collection automatically. In certain examples, compensation may be paid to a user to include user-generated content into a collection. In such cases, the collection management system 924 operates to automatically make payments to such users to use their content.

A map system 926 provides various geographic location (e.g., geolocation) functions and supports the presentation of map-based media content and messages by the interaction client 908. For example, the map system 926 enables the display of user icons or avatars (e.g., stored in profile data 1002) on a map to indicate a current or past location of "friends" of a user, as well as media content (e.g., collections of messages including photographs and videos) generated by such friends, within the context of a map. For example, a message posted by a user to the interaction system 904 from a specific geographic location may be displayed within the context of a map at that particular location to "friends" of a specific user on a map interface of the interaction client 908. A user can furthermore share his or her location and status information (e.g., using an appropriate status avatar) with other users of the interaction system 904 via the interaction client 908, with this location and status information being similarly displayed within the context of a map interface of the interaction client 908 to selected users.

A game system 928 provides various gaming functions within the context of the interaction client 908. The interaction client 908 provides a game interface providing a list of available games that can be launched by a user within the context of the interaction client 908 and played with other users of the interaction system 904. The interaction system 904 further enables a particular user to invite other users to participate in the play of a specific game by issuing invitations to such other users from the interaction client 908. The interaction client 908 also supports audio, video, and text messaging (e.g., chats) within the context of gameplay, provides a leaderboard for the games, and also supports the provision of in-game rewards (e.g., coins and items).

An external resource system 932 provides an interface for the interaction client 908 to communicate with remote servers (e.g., third-party server 812) to launch or access external resources, i.e., applications or applets. Each third-party server 812 hosts, for example, a markup language (e.g., HTML5) based application or a small-scale version of an application (e.g., game, utility, payment, or ride-sharing application). The interaction client 908 may launch a web-based resource (e.g., application) by accessing the HTML5 file from the third-party server 812 associated with the web-based resource. Applications hosted by third-party server 812 are programmed in JavaScript leveraging a Software Development Kit (SDK) provided by the interaction servers 930. The SDK includes Application Programming Interfaces (APIs) with functions that can be called or invoked by the web-based application. The interaction servers 930 host a JavaScript library that provides a given external resource access to specific user data of the interaction client 908. HTML5 is an example of technology for programming games, but applications and resources programmed based on other technologies can be used.

To integrate the functions of the SDK into the web-based resource, the SDK is downloaded by the third-party server 812 from the interaction servers 930 or is otherwise received by the third-party server 812. Once downloaded or received, the SDK is included as part of the application code of a web-based external resource. The code of the web-based resource can then call or invoke certain functions of the SDK to integrate features of the interaction client 908 into the web-based resource.

The SDK stored on the interaction server system 810 effectively provides the bridge between an external resource (e.g., applications 806 or applets) and the interaction client 908. This gives the user a seamless experience of communicating with other users on the interaction client 908 while also preserving the look and feel of the interaction client 908. To bridge communications between an external resource and an interaction client 908, the SDK facilitates communication between third-party server 812 and the interaction client 908. A bridge script running on a user system 802 establishes two one-way communication channels between an external resource and the interaction client 908. Messages are sent between the external resource and the interaction client 908 via these communication channels asynchronously. Each SDK function invocation is sent as a message and callback. Each SDK function is implemented by constructing a unique callback identifier and sending a message with that callback identifier.

By using the SDK, not all information from the interaction client 908 is shared with third-party server 812. The SDK limits which information is shared based on the needs of the external resource. Each third-party server 812 provides an HTML5 file corresponding to the web-based external resource to interaction servers 930. The interaction servers 930 can add a visual representation (such as a box art or other graphic) of the web-based external resource in the interaction client 908. Once the user selects the visual representation or instructs the interaction client 908 through a GUI of the interaction client 908 to access features of the web-based external resource, the interaction client 908 obtains the HTML5 file and instantiates the resources to access the features of the web-based external resource.

The interaction client 908 presents a graphical user interface (e.g., a landing page or title screen) for an external resource. During, before, or after presenting the landing page or title screen, the interaction client 908 determines whether the launched external resource has been previously authorized to access user data of the interaction client 908. In response to determining that the launched external resource has been previously authorized to access user data of the interaction client 908, the interaction client 908 presents another graphical user interface of the external resource that includes functions and features of the external resource. In response to determining that the launched external resource has not been previously authorized to access user data of the interaction client 908, after a threshold period of time (e.g., 3 seconds) of displaying the landing page or title screen of the external resource, the interaction client 908 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 908 adds the external resource to a list of authorized external resources and allows the external resource to access user data from the interaction client 908. The external resource is authorized by the interaction client 908 to access the user data under an OAuth 2 framework.

The interaction client 908 controls the type of user data that is shared with external resources based on the type of external resource being authorized. For example, external resources that include full-scale applications (e.g., an application 806) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 934 operationally enables the purchasing of advertisements by third parties for presentation to end-users via the interaction clients 908 and also handles the delivery and presentation of these advertisements.

An artificial intelligence and machine learning system 936 provides a variety of services to different subsystems within the interaction system 904. For example, the artificial intelligence and machine learning system 936 operates with the image processing system 902 and the camera system 906 to analyze images and extract information such as objects, text, or faces. This information can then be used by the image processing system 902 to enhance, filter, or manipulate images. The artificial intelligence and machine learning system 936 may be used by the augmentation system 910 to generate augmented content and augmented reality experiences, such as adding virtual objects or animations to real-world images. The communication system 912 and messaging system 914 may use the artificial intelligence and machine learning system 936 to analyze communication patterns and provide insights into how users interact with each other and provide intelligent message classification and tagging, such as categorizing messages based on sentiment or topic. The artificial intelligence and machine learning system 936 may also provide chatbot functionality to message interactions 820 between user system 802 interaction server system 810. The artificial intelligence and machine learning system 936 may also work with the audio communication system 920 to provide speech recognition and natural language processing capabilities, allowing users to interact with the interaction system 904 using voice commands.

Data Architecture

Figure 10:
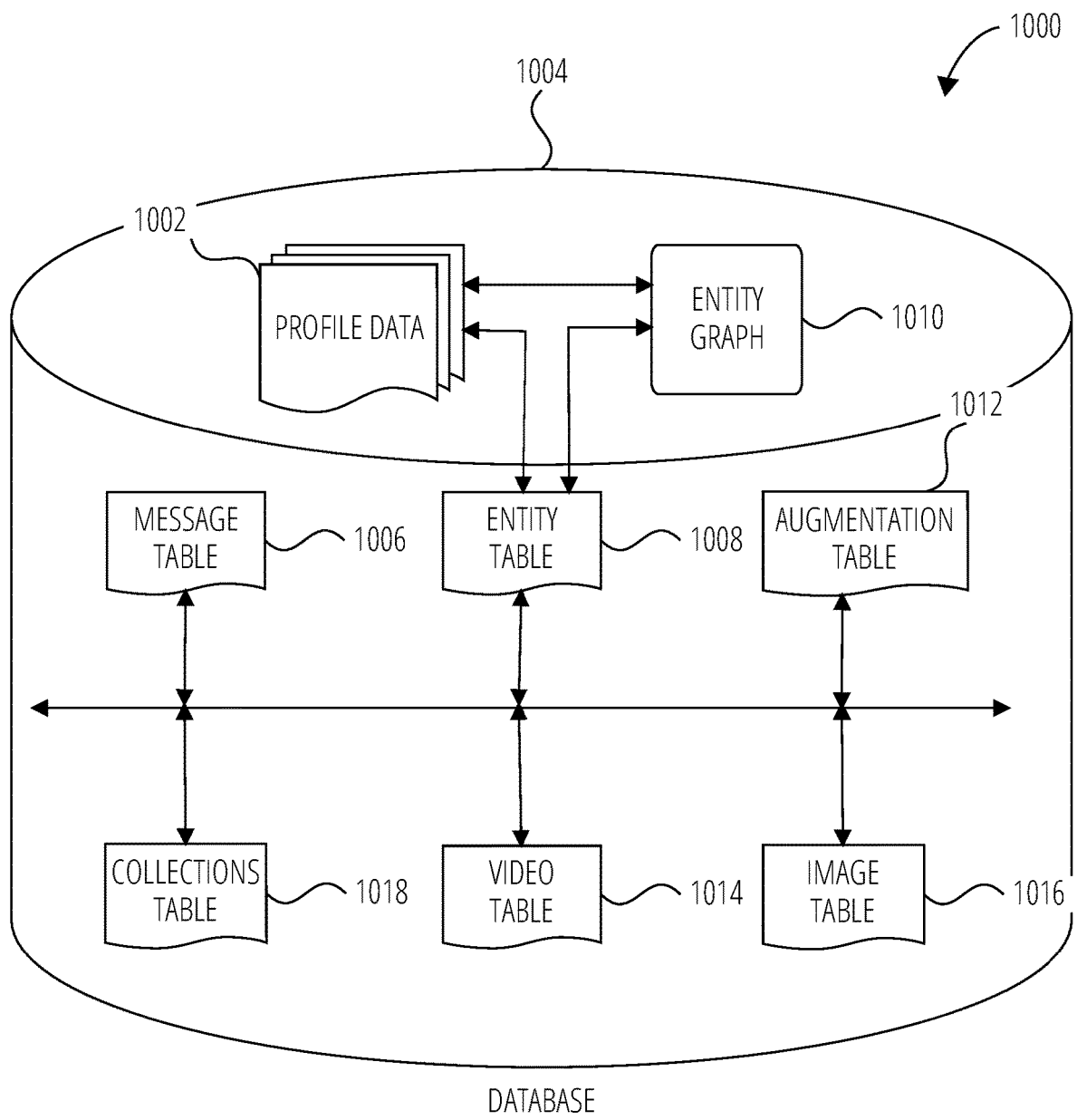
FIG. 10 is a diagrammatic representation of a data structure as maintained in a database, according to some examples.

FIG. 10 is a schematic diagram illustrating data structures 1000, which may be stored in the database 1004 of the interaction server system 810, according to certain examples. While the content of the database 1004 is shown to comprise multiple tables, it will be appreciated that the data could be stored in other types of data structures (e.g., as an object-oriented database).

The database 1004 includes message data stored within a message table 1006. This message data includes, for any particular message, at least message sender data, message recipient (or receiver) data, and a payload. Further details regarding information that may be included in a message and included within the message data stored in the message table 1006, are described below with reference to FIG. 10.

An entity table 1008 stores entity data, and is linked (e.g., referentially) to an entity graph 1010 and profile data 1002. Entities for which records are maintained within the entity table 1008 may include individuals, corporate entities, organizations, objects, places, events, and so forth. Regardless of entity type, any entity regarding which the interaction server system 810 stores data may be a recognized entity. Each entity is provided with a unique identifier, as well as an entity type identifier (not shown).

The entity graph 1010 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 800.

Certain permissions and relationships may be attached to each relationship, and also to each direction of a relationship. For example, a bidirectional relationship (e.g., a friend relationship between individual users) may include authorization for the publication of digital content items between the individual users but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user and may significantly restrict or block the publication of digital content from the individual user to the commercial user. A particular user, as an example of an entity, may record certain restrictions (e.g., by way of privacy settings) in a record for that entity within the entity table 1008. Such privacy settings may be applied to all types of relationships within the context of the interaction system 800 or may selectively be applied to certain types of relationships.

The profile data 1002 stores multiple types of profile data about a particular entity. The profile data 1002 may be selectively used and presented to other users of the interaction system 800 based on privacy settings specified by a particular entity. Where the entity is an individual, the profile data 1002 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 800, and on map interfaces displayed by interaction client 804 to other users. The collection of avatar representations may include "status avatars," which present a graphical representation of a status or activity that the user may select to communicate at a particular time.

Where the entity is a group, the profile data 1002 for the group may similarly include one or more avatar representations associated with the group, in addition to the group name, members, and various settings (e.g., notifications) for the relevant group.

The database 1004 also stores augmentation data, such as overlays or filters, in an augmentation table 1012. The augmentation data is associated with and applied to videos (for which data is stored in a video table 1014) and images (for which data is stored in an image table 1016).

Filters, in some examples, are overlays that are displayed as overlaid on an image or video during presentation to a recipient user. Filters may be of various types, including user-selected filters from a set of filters presented to a sending user by the interaction client 804 when the sending user is composing a message. Other types of filters include geolocation filters (also known as geo-filters), which may be presented to a sending user based on geographic location. For example, geolocation filters specific to a neighborhood or special location may be presented within a user interface by the interaction client 804, based on geolocation information determined by a Global Positioning System (GPS) unit of the user system 802.

Another type of filter is a data filter, which may be selectively presented to a sending user by the interaction client 804 based on other inputs or information gathered by the user system 802 during the message creation process. Examples of data filters include current temperature at a specific location, a current speed at which a sending user is traveling, battery life for a user system 802, or the current time.

Other augmentation data that may be stored within the image table 1016 includes augmented reality content items (e.g., corresponding to applying "lenses" or augmented reality experiences). An augmented reality content item may be a real-time special effect and sound that may be added to an image or a video.

A collections table 1018 stores data regarding collections of messages and associated image, video, or audio data, which are compiled into a collection (e.g., a story or a gallery). The creation of a particular collection may be initiated by a particular user (e.g., each user for which a record is maintained in the entity table 1008). A user may create a "personal story" in the form of a collection of content that has been created and sent/broadcast by that user. To this end, the user interface of the interaction client 804 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 804, to contribute content to a particular live story. The live story may be identified to the user by the interaction client 804, based on his or her location. The end result is a "live story" told from a community perspective.

A further type of content collection is known as a "location story," which enables a user whose user system 802 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 1014 stores video data that, in some examples, is associated with messages for which records are maintained within the message table 1006. Similarly, the image table 1016 stores image data associated with messages for which message data is stored in the entity table 1008. The entity table 1008 may associate various augmentations from the augmentation table 1012 with various images and videos stored in the image table 1016 and the video table 1014.

Data Communications Architecture

Figure 11:
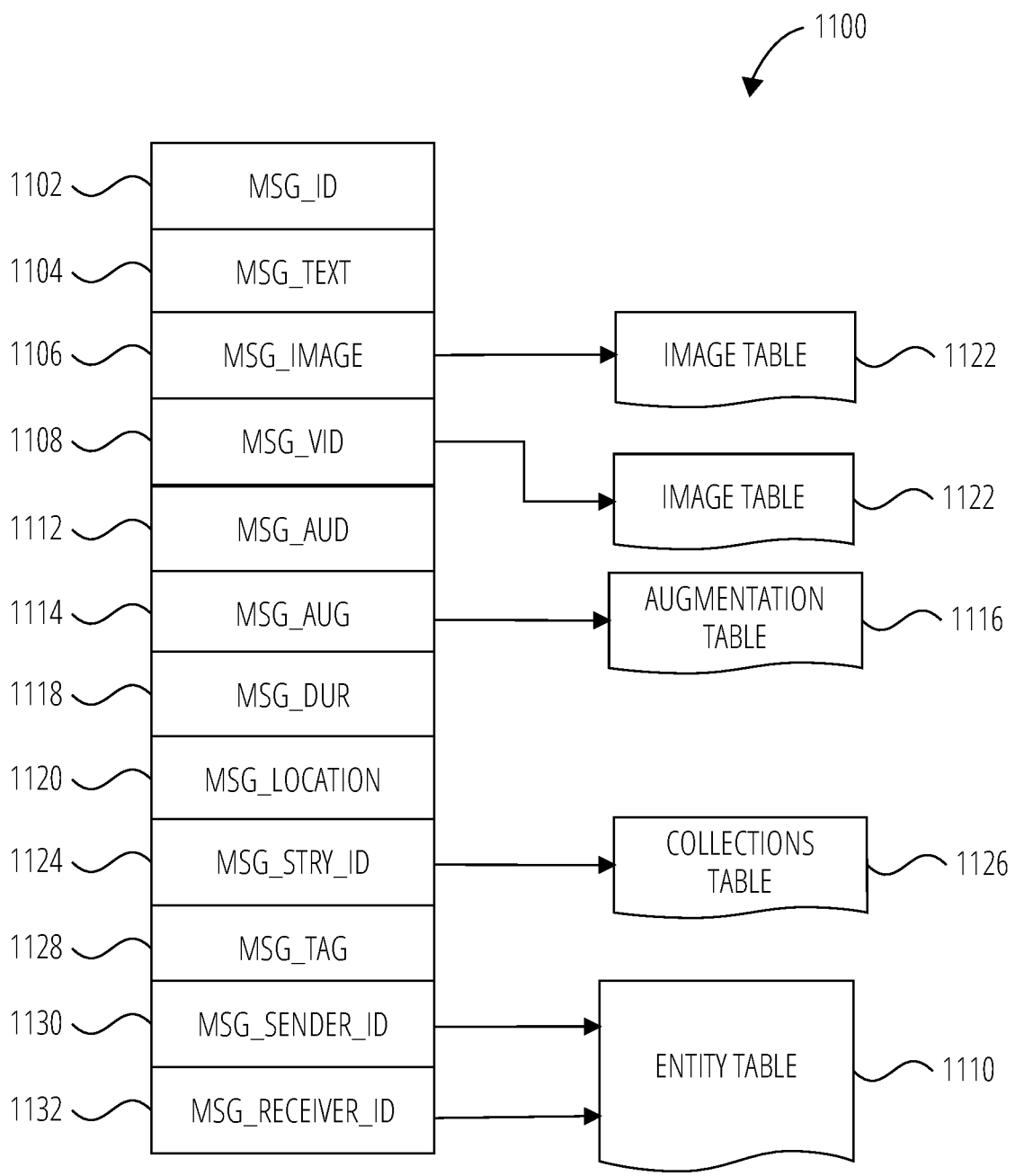
FIG. 11 is a diagrammatic representation of a message, according to some examples.

FIG. 11 is a schematic diagram illustrating a structure of a message 1100, according to some examples, generated by an interaction client 804 for communication to a further interaction client 804 via the interaction servers 824. The content of a particular message 1100 is used to populate the message table 1006 stored within the database 828, accessible by the interaction servers 824. Similarly, the content of a message 1100 is stored in memory as "in-transit" or "in-flight" data of the user system 802 or the interaction servers 824. A message 1100 is shown to include the following example components:

- Message identifier 1102: a unique identifier that identifies the message 1100.
- Message text payload 1104: text, to be generated by a user via a user interface of the user system 802, and that is included in the message 1100.
- Message image payload 1106: image data, captured by a camera component of a user system 802 or retrieved from a memory component of a user system 802, and that is included in the message 1100. Image data for a sent or received message 1100 may be stored in the image table 1122.
- Message video payload 1108: video data, captured by a camera component or retrieved from a memory component of the user system 802, and that is included in the message 1100. Video data for a sent or received message 1100 may be stored in the image table 1122.
- Message audio payload 1112: audio data, captured by a microphone or retrieved from a memory component of the user system 802, and that is included in the message 1100.
- Message augmentation data 1114: augmentation data (e.g., filters, stickers, or other annotations or enhancements) that represents augmentations to be applied to message image payload 1106, message video payload 1108, or message audio payload 1112 of the message 1100. Augmentation data for a sent or received message 1100 may be stored in the augmentation table 1116.
- Message duration parameter 1118: parameter value indicating, in seconds, the amount of time for which content of the message (e.g., the message image payload 1106, message video payload 1108, message audio payload 1112) is to be presented or made accessible to a user via the interaction client 804.
- Message geolocation parameter 1120: geolocation data (e.g., latitudinal and longitudinal coordinates) associated with the content payload of the message. Multiple message geolocation parameter 1120 values may be included in the payload, each of these parameter values being associated with respect to content items included in the content (e.g., a specific image within the message image payload 1106, or a specific video in the message video payload 1108).
- Message story identifier 1124: identifier values identifying one or more content collections (e.g., "stories" identified in the collections table 1126) with which a particular content item in the message image payload 1106 of the message 1100 is associated. For example, multiple images within the message image payload 1106 may each be associated with multiple content collections using identifier values.
- Message tag 1128: each message 1100 may be tagged with multiple tags, each of which is indicative of the subject matter of content included in the message payload. For example, where a particular image included in the message image payload 1106 depicts an animal (e.g., a lion), a tag value may be included within the message tag 1128 that is indicative of the relevant animal. Tag values may be generated manually, based on user input, or may be automatically generated using, for example, image recognition.
- Message sender identifier 1130: an identifier (e.g., a messaging system identifier, email address, or device identifier) indicative of a user of the user system 802 on which the message 1100 was generated and from which the message 1100 was sent.
- Message receiver identifier 1132: an identifier (e.g., a messaging system identifier, email address, or device identifier) indicative of a user of the user system 802 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 1122. Similarly, values within the message video payload 1108 may point to data stored within an image table 1122, values stored within the message augmentation data 1114 may point to data stored in an augmentation table 1116, values stored within the message story identifier 1124 may point to data stored in a collections table 1126, and values stored within the message sender identifier 1130 and the message receiver identifier 1132 may point to user records stored within an entity table 1110.

Machine Architecture

Figure 12:
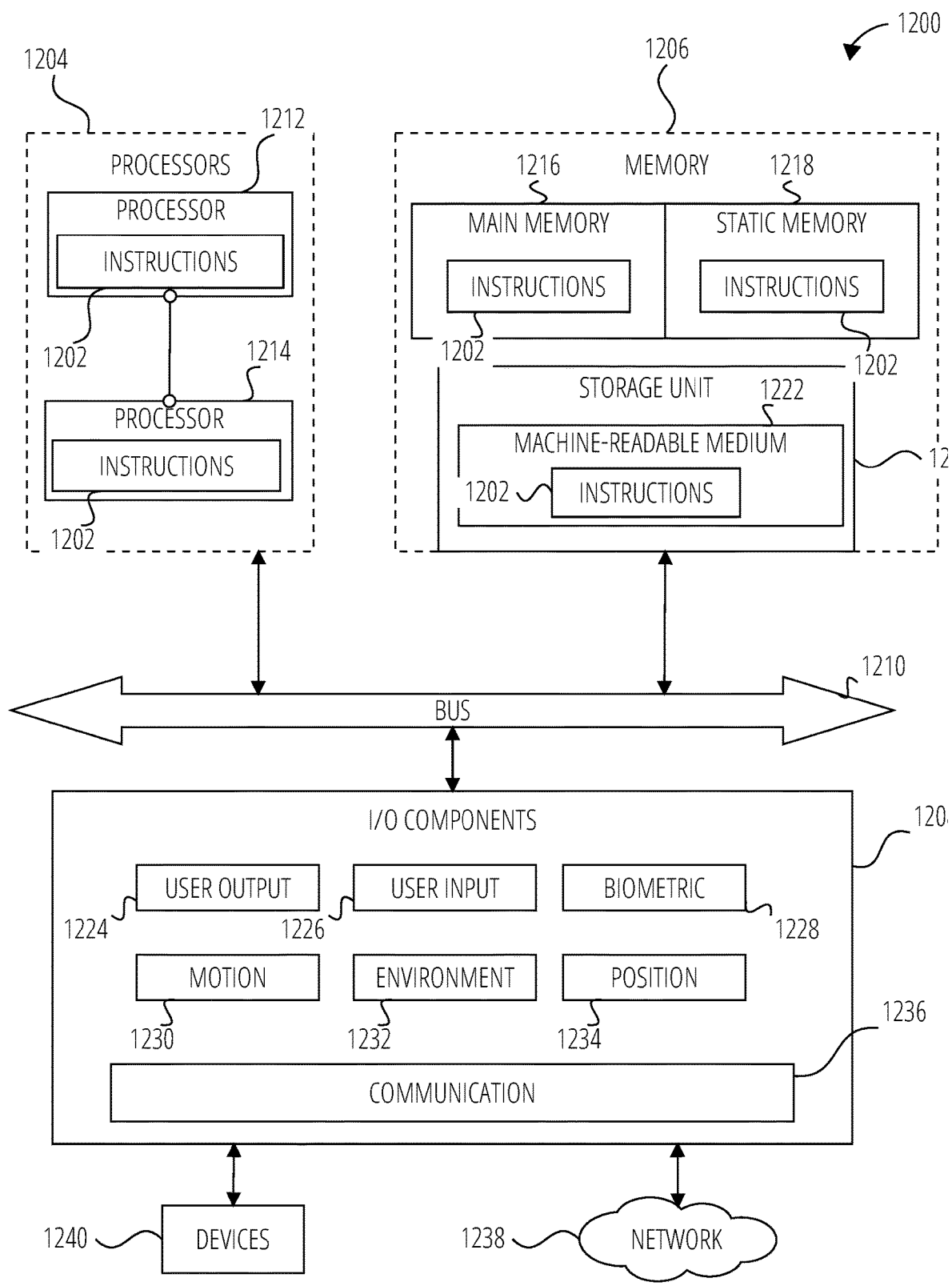
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. The machine 1200, for example, may comprise the user system 802 or any one of multiple server devices forming part of the interaction server system 810. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 802 may have a camera system comprising, for example, front cameras on a front surface of the user system 802 and rear cameras on a rear surface of the user system 802. The front cameras may, for example, be used to capture still images and video of a user of the user system 802 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 802 may also include a 360° camera for capturing 360° photographs and videos.

Further, the camera system of the user system 802 may include dual rear cameras (e.g., a primary camera as well as a depth-sensing camera), or even triple, quad or penta rear camera configurations on the front and rear sides of the user system 802. These multiple cameras systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., hypertext transfer protocol (HTTP)). Similarly, the instructions 1202 may be transmitted or received using a transmission medium via a coupling (e.g., a peer-to-peer coupling) to the devices 1240.

Software Architecture

Figure 13:
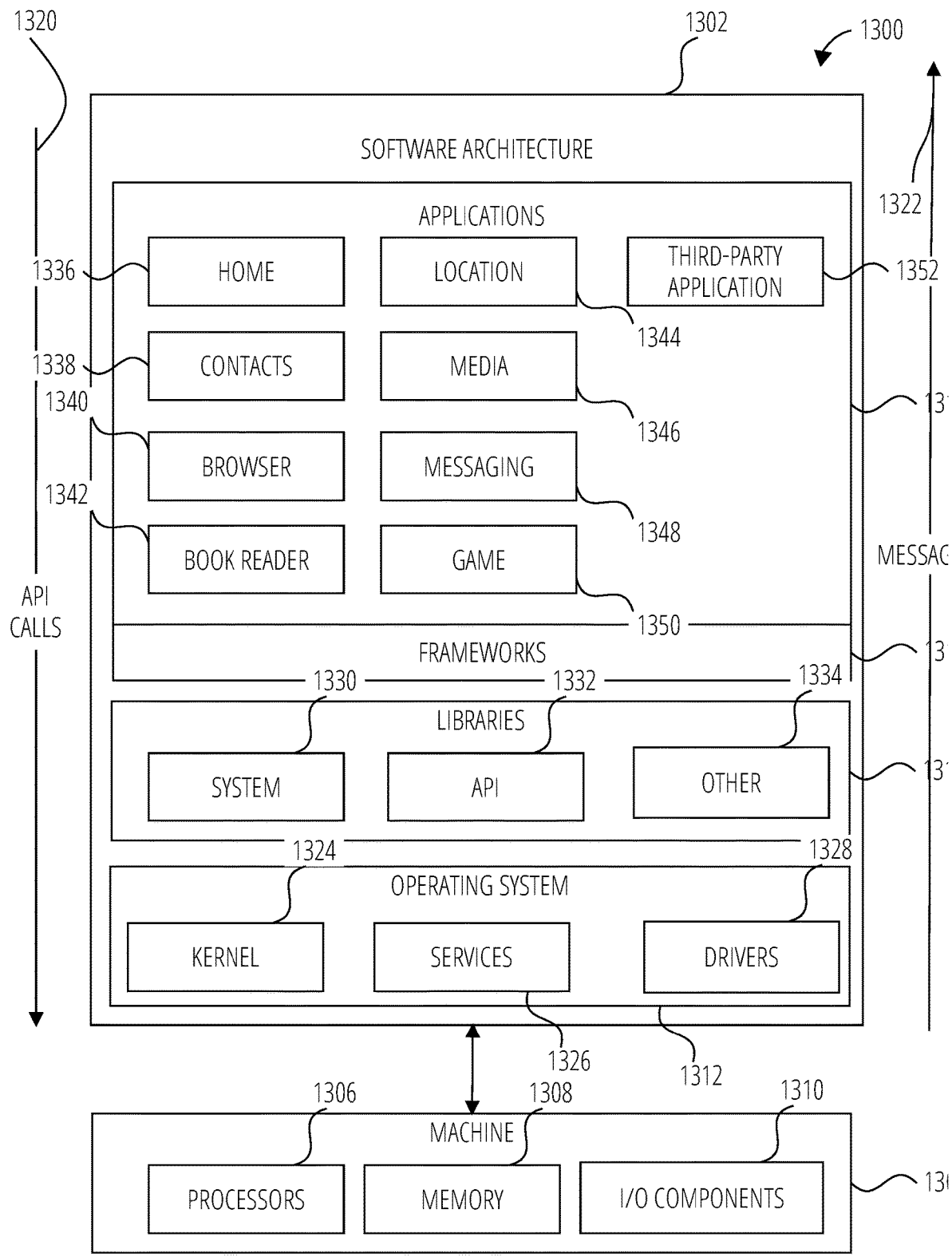
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a contacts application 1338, a browser application 1340, a book reader application 1342, a location application 1344, a media application 1346, a messaging application 1348, a game application 1350, and a broad assortment of other applications such as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1352 can invoke the API calls 1320 provided by the operating system 1312 to facilitate functionalities described herein.

Examples

Example 1 is a method comprising: accessing first pose data of a first handheld device; receiving second pose data of a second handheld device; detecting, from the first handheld device, hand-tracking data of a second user holding the second handheld device; and aligning a first coordinate system of the first handheld device with a second coordinate system of the second handheld device based on the first pose data, the second pose data, and the hand-tracking data of the second user holding the second handheld device.

In Example 2, the subject matter of Example 1 includes, mapping the first coordinate system to the second coordinate system by aligning the first coordinate system with the second coordinate system; and displaying content in a display of the first handheld device based on the mapping.

In Example 3, the subject matter of Examples 1-2 includes, degree-of-freedom tracker configured to identify the first pose data at time t, wherein the second handheld device comprises a second 3 is missing parent: 3 is missing parent: 6 degree-of-freedom tracker configured to identify the second pose data at time t, wherein the second handheld device is configured to wirelessly transmit the second pose data at time t to the first handheld device.

In Example 4, the subject matter of Examples 1-3 includes, wherein the first handheld device comprises a first camera that is aimed at the second handheld device and a hand of the second user holding the second handheld device, wherein the second handheld device comprises a second camera that is aimed at the first handheld device.

In Example 5, the subject matter of Examples 1-4 includes, wherein the second handheld device is within a field of view of a first camera of the first handheld device.

In Example 6, the subject matter of Examples 1-5 includes, wherein detecting, from the first handheld device, the hand-tracking data of the second user holding the second handheld device comprises: capturing, using a first camera of the first handheld device, an image of one or more fingers of a hand of the second user; and identifying, using a hand-tracking recognition process, a position of a hand joint based on the image of the one or more fingers of the hand of the second user.

In Example 7, the subject matter of Example 6 includes, identifying a first coordinate transformation between the position of the hand joint and a second pose of the second handheld device, the second pose based on the second pose data; and identifying a second coordinate transformation between the position of the hand joint and a first pose of the first handheld device, the first pose based on the first pose data.

In Example 8, the subject matter of Example 7 includes, wherein aligning the first coordinate system of the first handheld device with the second coordinate system of the second handheld device is further based on the first coordinate transformation and the second coordinate transformation.

In Example 9, the subject matter of Example 8 includes, detecting an initiation of a session of an augmented reality application at the first handheld device; in response to detecting the initiation of the session, calibrating the first handheld device by aligning the first coordinate system of the first handheld device with the second coordinate system of the second handheld device for a predefined number of image frames generated with the first handheld device; and displaying content in a display of the first handheld device based on an alignment of the first coordinate system with the second coordinate system.

In Example 10, the subject matter of Examples 1-9 includes, determining a relative pose between the first handheld device and the second handheld device by: identifying a first reference coordinate frame based on the first pose data; identifying a second reference coordinate frame based on the second pose data; and forming a world reference coordinate system based on the first reference coordinate frame and the second reference coordinate frame.

Example 11 is a server comprising: a processor; and a memory storing instructions that, when executed by the processor, configure the server to: access first pose data of a first handheld device; receive second pose data of a second handheld device; detect, from the first handheld device, hand-tracking data of a second user holding the second handheld device; and align a first coordinate system of the first handheld device with a second coordinate system of the second handheld device based on the first pose data, the second pose data, and the hand-tracking data of the second user holding the second handheld device.

In Example 12, the subject matter of Example 11 includes, wherein the instructions further configure the server to: map the first coordinate system to the second coordinate system by aligning the first coordinate system with the second coordinate system; and display content in a display of the first handheld device based on the mapping.

In Example 13, the subject matter of Examples 11-12 includes, degree-of-freedom tracker configured to identify the first pose data at time t, wherein the second handheld device comprises a second 6 degree-of-freedom tracker configured to identify the second pose data at time t, wherein the second handheld device is configured to wirelessly transmit the second pose data at time t to the first handheld device.

In Example 14, the subject matter of Examples 11-13 includes, wherein the first handheld device comprises a first camera that is aimed at the second handheld device and a hand of the second user holding the second handheld device, wherein the second handheld device comprises a second camera that is aimed at the first handheld device.

In Example 15, the subject matter of Examples 11-14 includes, wherein the second handheld device is within a field of view of a first camera of the first handheld device.

In Example 16, the subject matter of Examples 11-15 includes, wherein detecting, from the first handheld device, the hand-tracking data of the second user holding the second handheld device comprises: capture, using a first rear camera of the first handheld device, an image of one or more fingers of a hand of the second user; and identify, using a hand-tracking recognition process, a position of a hand joint based on the image of the one or more fingers of the hand of the second user.

In Example 17, the subject matter of Example 16 includes, wherein the instructions further configure the server to: identify a first coordinate transformation between the position of the hand joint and a second pose of the second handheld device, the second pose based on the second pose data; and identify a second coordinate transformation between the position of the hand joint and a first pose of the first handheld device, the first pose based on the first pose data.

In Example 18, the subject matter of Example 17 includes, wherein aligning the first coordinate system of the first handheld device with the second coordinate system of the second handheld device is further based on the first coordinate transformation and the second coordinate transformation.

In Example 19, the subject matter of Example 18 includes, wherein the instructions further configure the server to: detect an initiation of a session of an augmented reality application at the first handheld device; in response to detecting the initiation of the session, calibrate the first handheld device by aligning the first coordinate system of the first handheld device with the second coordinate system of the second handheld device for a predefined number of image frames generated with the first handheld device; and display content in a display of the first handheld device based on an alignment of the first coordinate system with the second coordinate system.

Example 20 is a non-transitory computer-readable storage medium, the computer-readable storage medium including instructions that when executed by a server, cause the server to: access first pose data of a first handheld device; receive second pose data of a second handheld device; detect, from the first handheld device, hand-tracking data of a second user holding the second handheld device; and align a first coordinate system of the first handheld device with a second coordinate system of the second handheld device based on the first pose data, the second pose data, and the hand-tracking data of the second user holding the second handheld device.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises, a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both Machine-Storage Media and transmission media. Thus, the terms include both storage devices/media and carrier waves/modulated data signals. The terms "machine-readable medium," "Computer-Readable Medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of Machine-Storage Media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "Machine-Storage Medium," "device-storage medium," "computer-storage medium" mean the same thing and may be used interchangeably in this disclosure. The terms "Machine-Storage Media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A method comprising:
   accessing first pose data of a first handheld device;
   receiving second pose data of a second handheld device;
   detecting, from the first handheld device, hand-tracking data of a second user holding the second handheld device; and
   aligning a first coordinate system of the first handheld device with a second coordinate system of the second handheld device based on the first pose data, the second pose data, and the hand-tracking data of the second user holding the second handheld device,
   wherein detecting, from the first handheld device, the hand-tracking data of the second user holding the second handheld device comprises:
      capturing, using a first camera of the first handheld device, an image of one or more fingers of a hand of the second user;
      identifying, using a hand-tracking recognition process, a position of a hand joint based on the image of the one or more fingers of the hand of the second user;
      identifying a first coordinate transformation between the position of the hand joint and a second pose of the second handheld device, the second pose based on the second pose data; and
      identifying a second coordinate transformation between the position of the hand joint and a first pose of the first handheld device, the first pose based on the first pose data.

2. The method of claim 1, further comprising:
   mapping the first coordinate system to the second coordinate system by aligning the first coordinate system with the second coordinate system; and
   displaying content in a display of the first handheld device based on the mapping.

3. The method of claim 1, wherein the first handheld device comprises a first 6 degree-of-freedom tracker configured to identify the first pose data at a time t,
   wherein the second handheld device comprises a second 6 degree-of-freedom tracker configured to identify the second pose data at the time t,
   wherein the second handheld device is configured to wirelessly transmit the second pose data at the time t to the first handheld device.

4. The method of claim 1, wherein the first handheld device comprises a first camera that is aimed at the second handheld device and a hand of the second user holding the second handheld device,
   wherein the second handheld device comprises a second camera that is aimed at the first handheld device.

5. The method of claim 1, wherein the second handheld device is within a field of view of a first camera of the first handheld device.

6. The method of claim 1, wherein aligning the first coordinate system of the first handheld device with the second coordinate system of the second handheld device is further based on the first coordinate transformation and the second coordinate transformation.

7. The method of claim 6, further comprising:
   detecting an initiation of a session of an augmented reality application at the first handheld device;
   in response to detecting the initiation of the session, calibrating the first handheld device by aligning the first coordinate system of the first handheld device with the second coordinate system of the second handheld device for a predefined number of image frames generated with the first handheld device; and
   displaying content in a display of the first handheld device based on an alignment of the first coordinate system with the second coordinate system.

8. The method of claim 1, further comprises determining a relative pose between the first handheld device and the second handheld device by:
   identifying a first reference coordinate frame based on the first pose data;
   identifying a second reference coordinate frame based on the second pose data; and forming a world reference coordinate system based on the first reference coordinate frame and the second reference coordinate frame.

9. A server comprising:
a processor; and
a memory storing instructions that, when executed by the processor, configure the server to:
access first pose data of a first handheld device;
receive second pose data of a second handheld device;
detect, from the first handheld device, hand-tracking data of a second user holding the second handheld device; and
align a first coordinate system of the first handheld device with a second coordinate system of the second handheld device based on the first pose data, the second pose data, and the hand-tracking data of the second user holding the second handheld device,
wherein detecting, from the first handheld device, the hand-tracking data of the second user holding the second handheld device comprises:
  capturing, using a first camera of the first handheld device, an image of one or more fingers of a hand of the second user;
  identifying, using a hand-tracking recognition process, a position of a hand joint based on the image of the one or more fingers of the hand of the second user;
  identifying a first coordinate transformation between the position of the hand joint and a second pose of the second handheld device, the second pose based on the second pose data; and
  identifying a second coordinate transformation between the position of the hand joint and a first pose of the first handheld device, the first pose based on the first pose data.

10. The server of claim 9, wherein the instructions further configure the server to:
  map the first coordinate system to the second coordinate system by aligning the first coordinate system with the second coordinate system; and
  display content in a display of the first handheld device based on the mapping.

11. The server of claim 9, wherein the first handheld device comprises a first 6 degree-of-freedom tracker configured to identify the first pose data at a time t,
  wherein the second handheld device comprises a second 6 degree-of-freedom tracker configured to identify the second pose data at the time t,
  wherein the second handheld device is configured to wirelessly transmit the second pose data at the time t to the first handheld device.

12. The server of claim 9, wherein the first handheld device comprises a first camera that is aimed at the second handheld device and a hand of the second user holding the second handheld device,
wherein the second handheld device comprises a second camera that is aimed at the first handheld device.

13. The server of claim 9, wherein the second handheld device is within a field of view of a first camera of the first handheld device.

14. The server of claim 9, wherein aligning the first coordinate system of the first handheld device with the second coordinate system of the second handheld device is further based on the first coordinate transformation and the second coordinate transformation.

15. The server of claim 14, wherein the instructions further configure the server to:
  detect an initiation of a session of an augmented reality application at the first handheld device;
  in response to detecting the initiation of the session, calibrate the first handheld device by aligning the first coordinate system of the first handheld device with the second coordinate system of the second handheld device for a predefined number of image frames generated with the first handheld device; and
  display content in a display of the first handheld device based on an alignment of the first coordinate system with the second coordinate system.

16. A non-transitory computer-readable storage medium, the computer-readable storage medium including instructions that when executed by a server, cause the server to:
access first pose data of a first handheld device;
receive second pose data of a second handheld device;
detect, from the first handheld device, hand-tracking data of a second user holding the second handheld device; and
align a first coordinate system of the first handheld device with a second coordinate system of the second handheld device based on the first pose data, the second pose data, and the hand-tracking data of the second user holding the second handheld device,
wherein detect, from the first handheld device, the hand-tracking data of the second user holding the second handheld device comprises:
  capturing, using a first camera of the first handheld device, an image of one or more fingers of a hand of the second user;
  identifying, using a hand-tracking recognition process, a position of a hand joint based on the image of the one or more fingers of the hand of the second user;
  identifying a first coordinate transformation between the position of the hand joint and a second pose of the second handheld device, the second pose based on the second pose data; and
  identifying a second coordinate transformation between the position of the hand joint and a first pose of the first handheld device, the first pose based on the first pose data.

\* \* \* \* \*